United States Patent [19]
Grey

[11] Patent Number: 5,897,417
[45] Date of Patent: Apr. 27, 1999

[54] CONSTRUCTION SYSTEM

[75] Inventor: Michael J. Grey, San Francisco, Calif.

[73] Assignee: Primordial, LLC, San Francisco, Calif.

[21] Appl. No.: 08/763,459

[22] Filed: Dec. 11, 1996

Related U.S. Application Data

[60] Provisional application No. 60/011,609, Dec. 11, 1995.

[51] Int. Cl.$^6$ .......................... A63H 33/08; A63H 33/12; F16D 1/00; F16C 11/06
[52] U.S. Cl. .......................... 446/125; 446/102; 446/383; 403/90; 403/340; 403/354
[58] Field of Search ................................... 446/124, 125, 446/126, 120, 102, 104, 97, 375, 376, 378, 381, 383; 473/350, 598, 597, 600; 403/90, DIG. 6, 122, 76, 340, 339, 364, 359, 56; 16/110 R; 464/139

[56] References Cited

U.S. PATENT DOCUMENTS

| | | |
|---|---|---|
| 892,105 | 6/1908 | White .......................................... 403/90 |
| 1,317,903 | 10/1919 | Whimster . |
| 1,531,162 | 3/1925 | Valero ...................................... 473/600 |
| 1,601,447 | 9/1926 | Huck ....................................... 446/375 |
| 1,965,601 | 7/1934 | Kotrbaty . |
| 2,296,699 | 9/1942 | Bourdelais, Sr. et al. . |
| 2,533,494 | 12/1950 | Mitchell, Jr. . |
| 2,662,335 | 12/1953 | Calverley . |
| 2,674,501 | 4/1954 | Biegler . |
| 3,102,367 | 9/1963 | Pedersen et al. . |
| 3,392,480 | 7/1968 | Stubbmann . |
| 3,433,510 | 3/1969 | Hulterstrum ........................... 403/90 X |
| 3,477,167 | 11/1969 | Ach . |
| 3,487,579 | 1/1970 | Brettingen . |
| 3,550,311 | 12/1970 | Fouguart . |
| 3,605,322 | 9/1971 | Matsubayashi et al. . |
| 3,691,788 | 9/1972 | Mazziotti . |
| 3,777,393 | 12/1973 | Baer . |
| 3,791,091 | 2/1974 | Albrizzi . |
| 4,548,590 | 10/1985 | Green . |
| 4,606,732 | 8/1986 | Lyman . |
| 4,620,813 | 11/1986 | Lacher . |
| 4,739,648 | 4/1988 | Berndt . |
| 4,789,369 | 12/1988 | Lyman . |
| 5,049,104 | 9/1991 | Olsen . |
| 5,172,534 | 12/1992 | Milner et al. . |
| 5,280,871 | 1/1994 | Chuang . |
| 5,322,467 | 6/1994 | Barzani . |
| 5,368,592 | 11/1994 | Stern et al. . |
| 5,588,767 | 12/1996 | Merlo ........................................ 403/90 |

FOREIGN PATENT DOCUMENTS

| | | |
|---|---|---|
| 0490033 | 6/1992 | European Pat. Off. . |
| 2556791 | 3/1985 | France . |
| 2356930 | 5/1975 | Germany . |
| 2258821 | 2/1993 | United Kingdom . |

OTHER PUBLICATIONS

Tangle Leapers and Things packaging.
You're ready for a KNEX building adventure packaging.
Construx Action Building System Deluxe Builder Building Set.
Krazy Ikes packaging.
Loc–Line The Original Modular Hose System parts list.
Zometool Manual 2.0.

*Primary Examiner*—D Neal Muir
*Attorney, Agent, or Firm*—Christie, Parker & Hale, LLP

[57] ABSTRACT

A construction system where elements have connection components for a ball-to-socket or socket-to-socket connection. The ball-to-socket connection "locks" at orientations when one or more detents in the interior of the socket protrude into one or more of a plurality of dimples on the ball. The construction elements generally have an elongated body with a dimpled ball at one end and a socket at the other end, or dimpled balls at both ends, or sockets at both ends. In addition to the ball-and-socket connection, elements may connect in a socket-to-body connection, or a number of different types of socket-to-socket connections. The socket has at least two petals with a lip contour such that in one type of socket-to-socket connection the pair of sockets interlock to form a sphere. The irregular shape of the lip of the socket allows a ball to be leveraged out of a socket, and make orientations over at least $2\pi$ steradians available in a ball-to-socket interconnection.

27 Claims, 18 Drawing Sheets

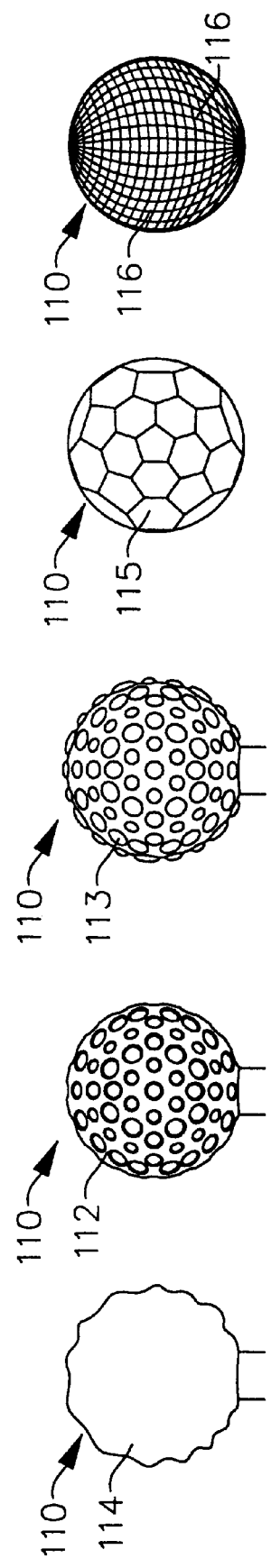
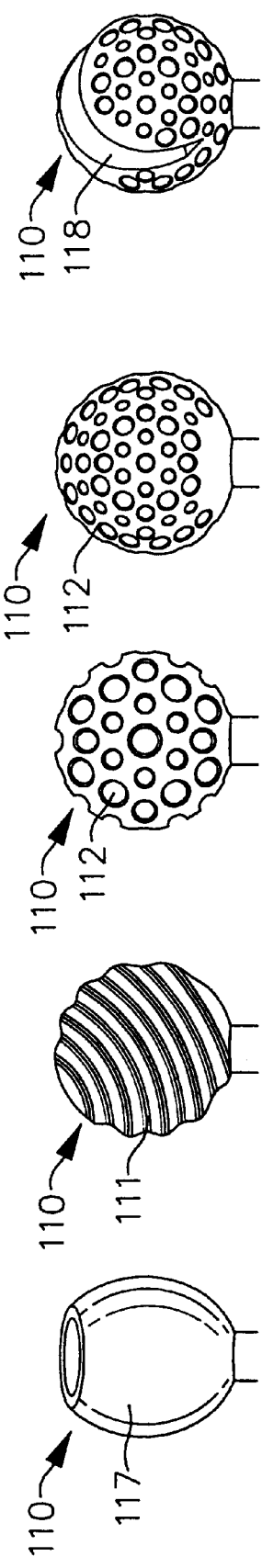

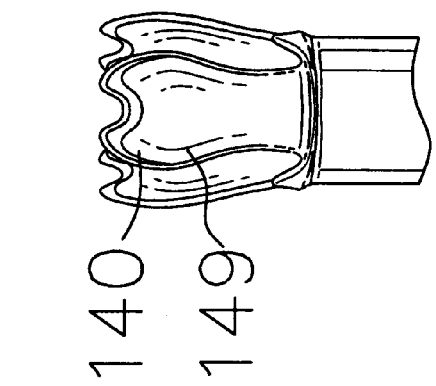
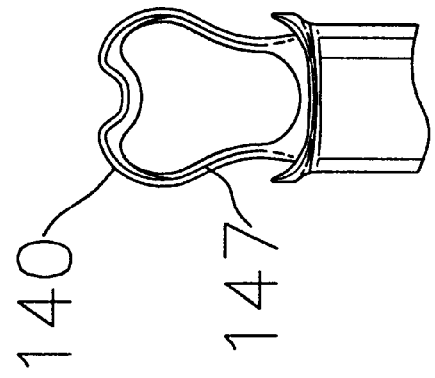
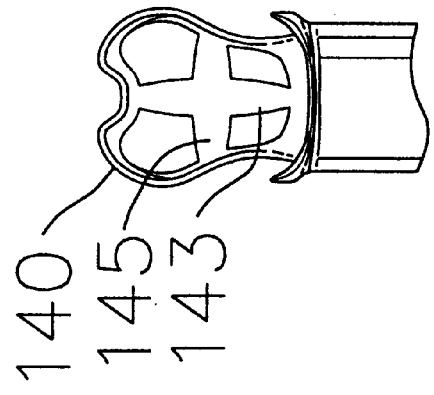
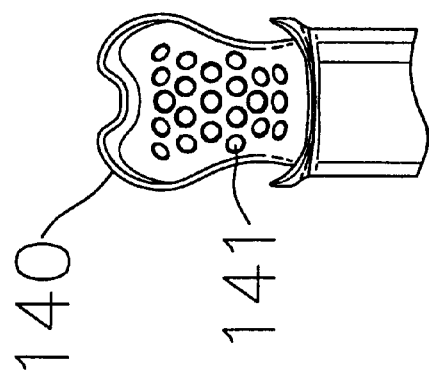

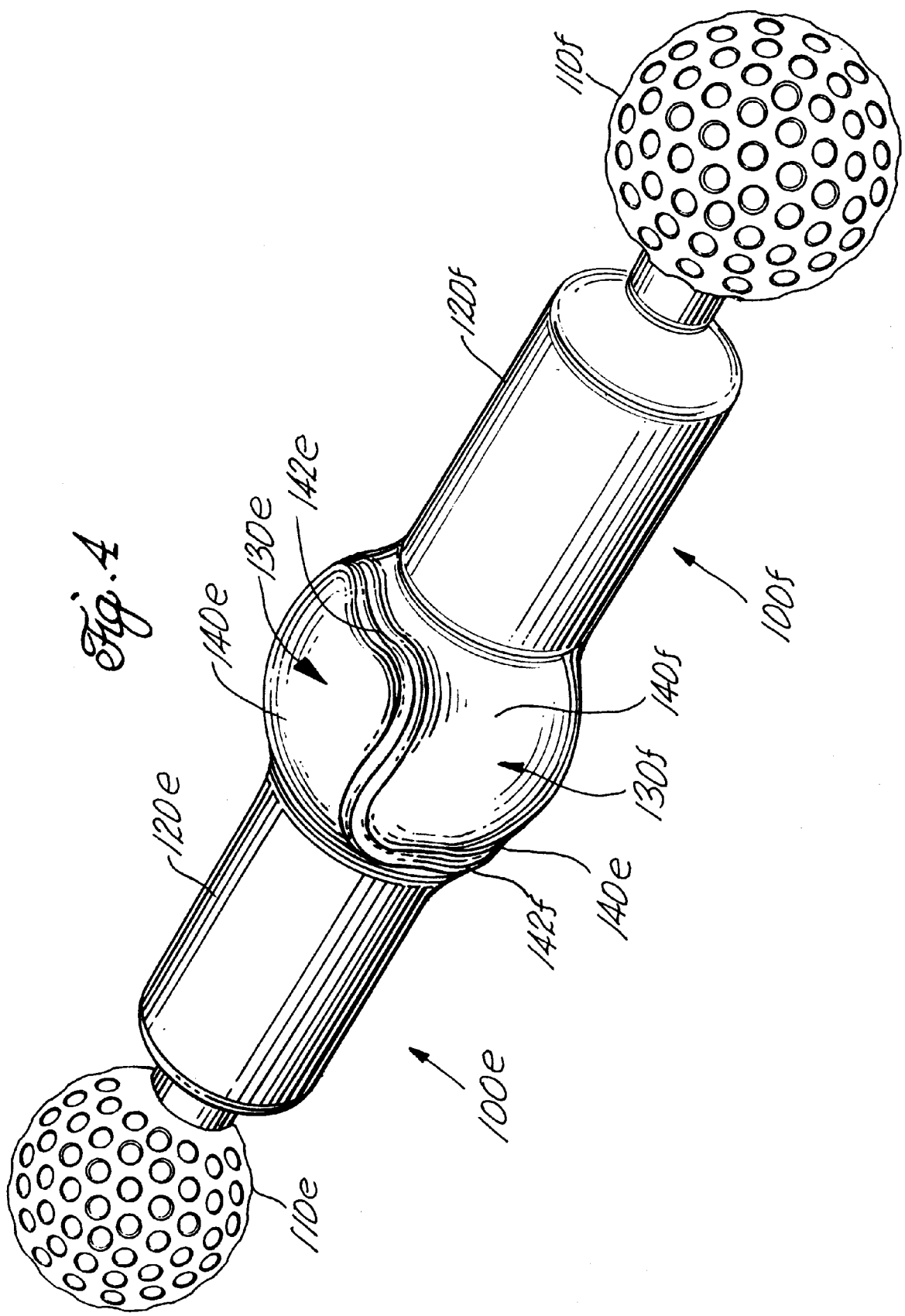

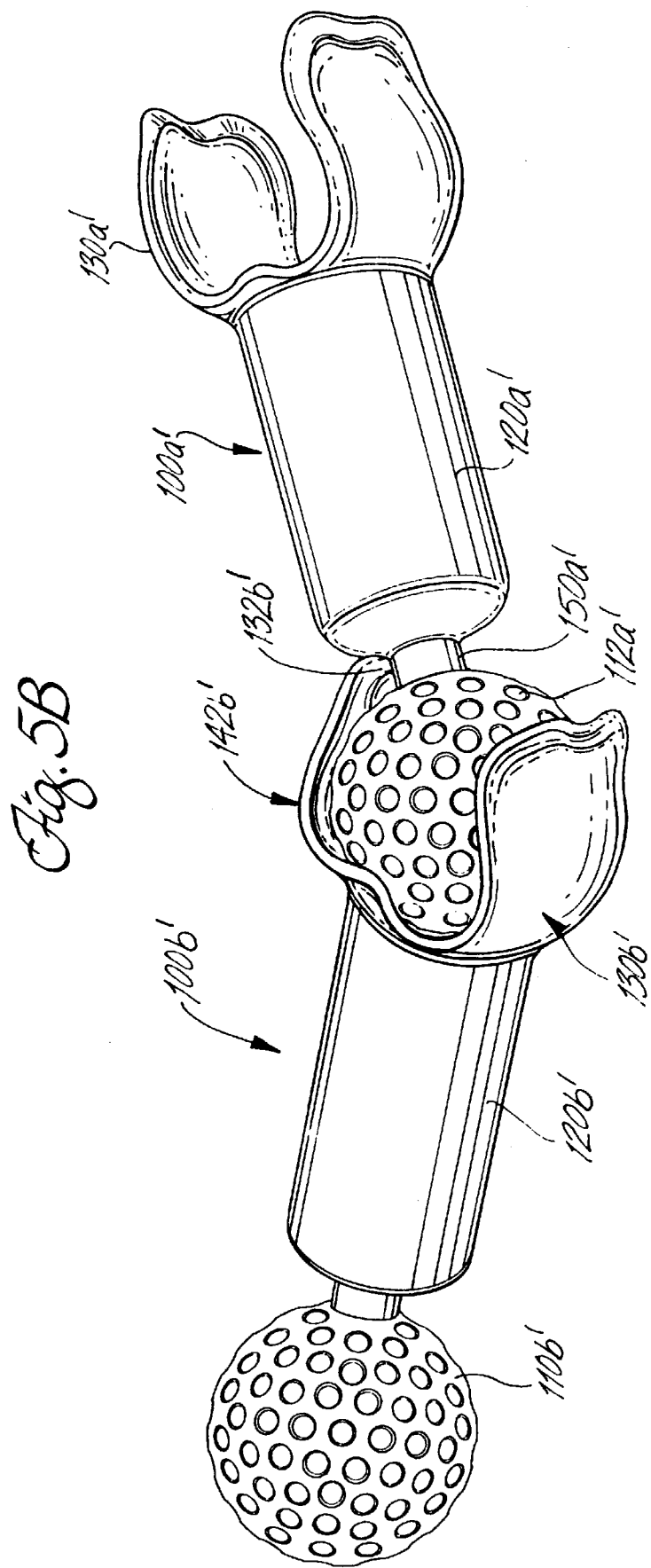

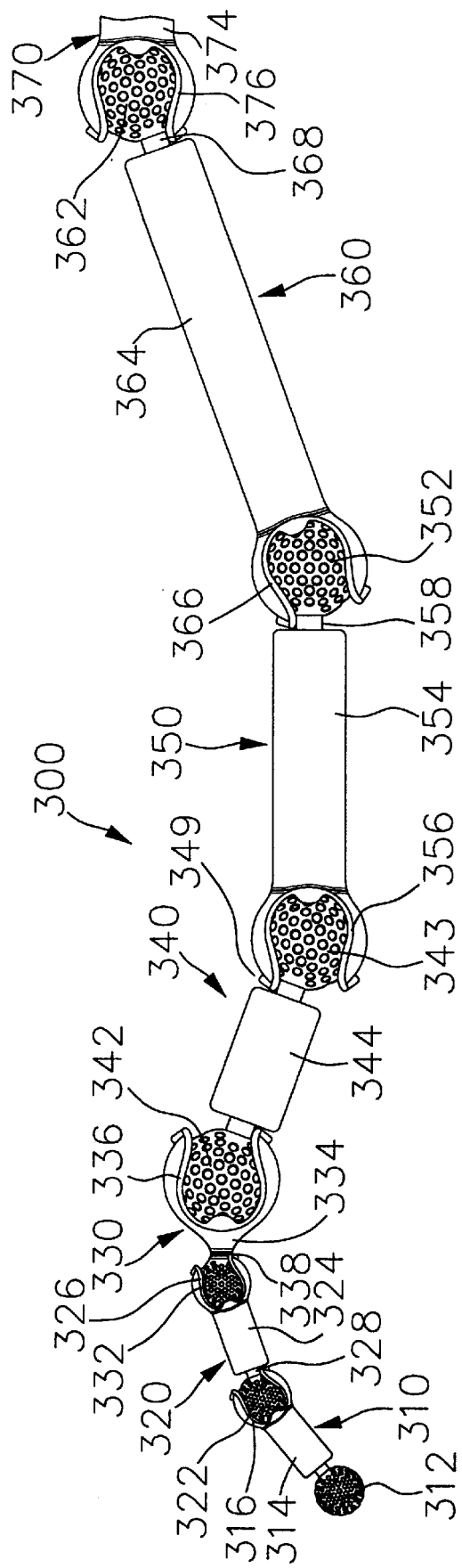

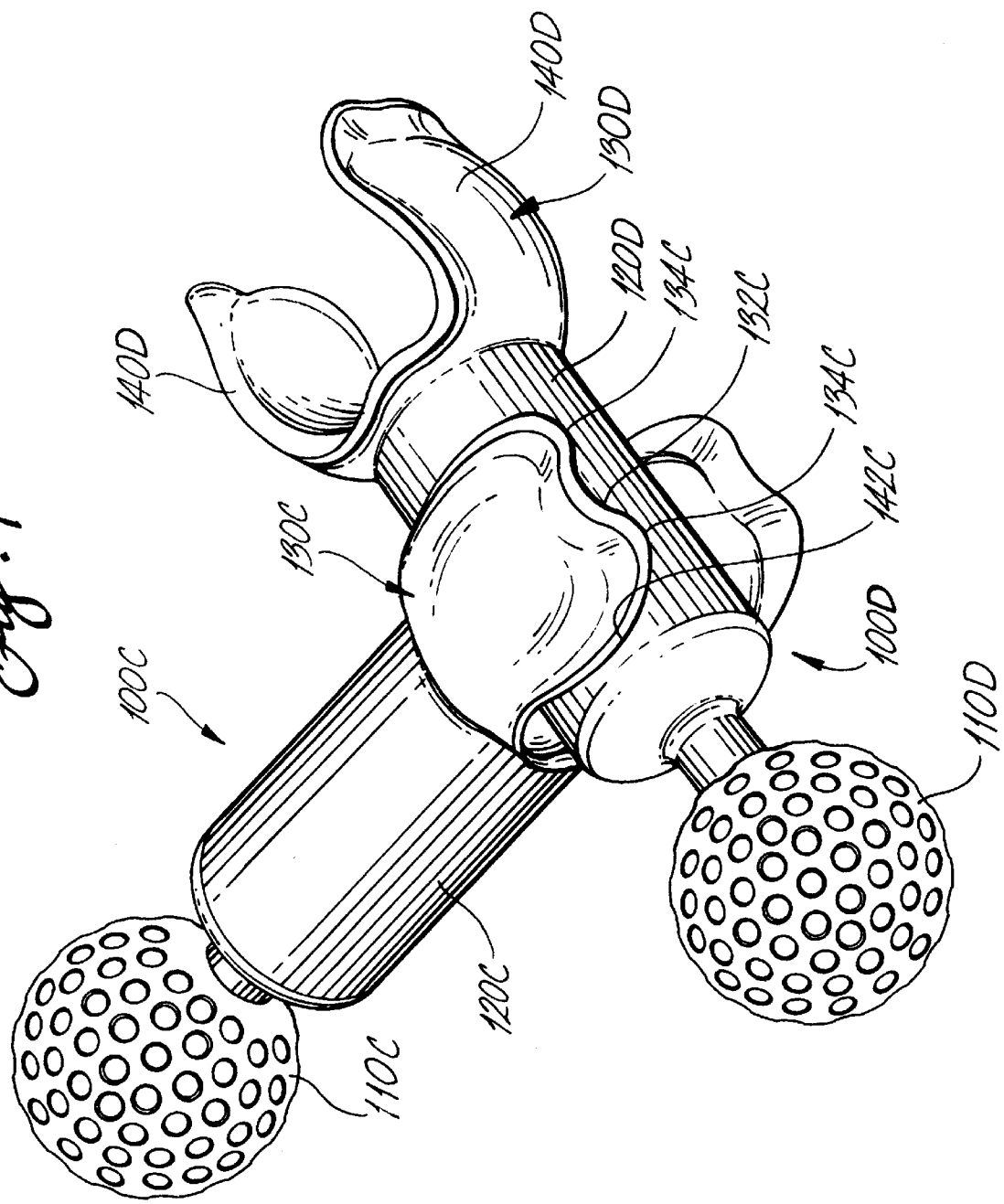

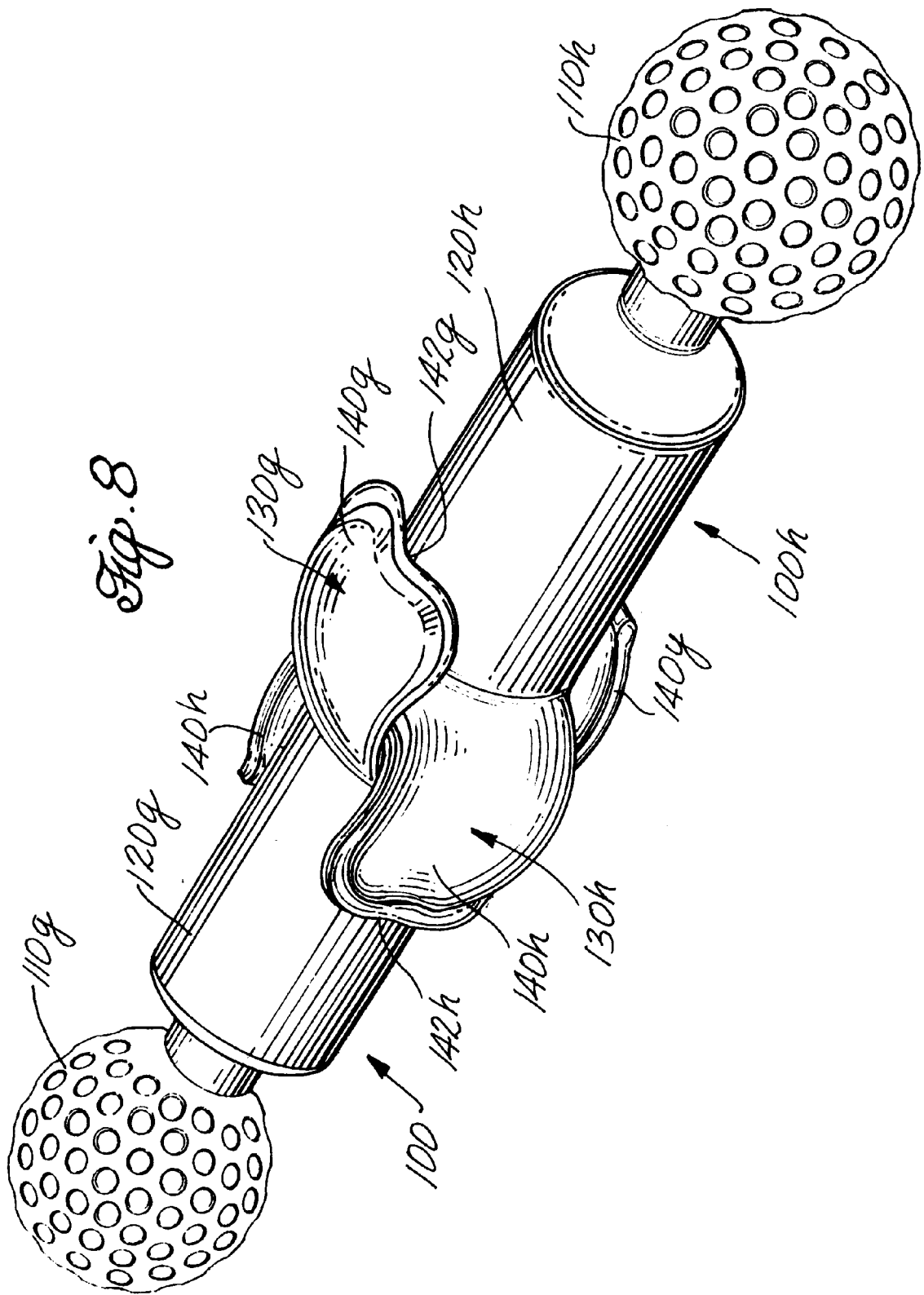

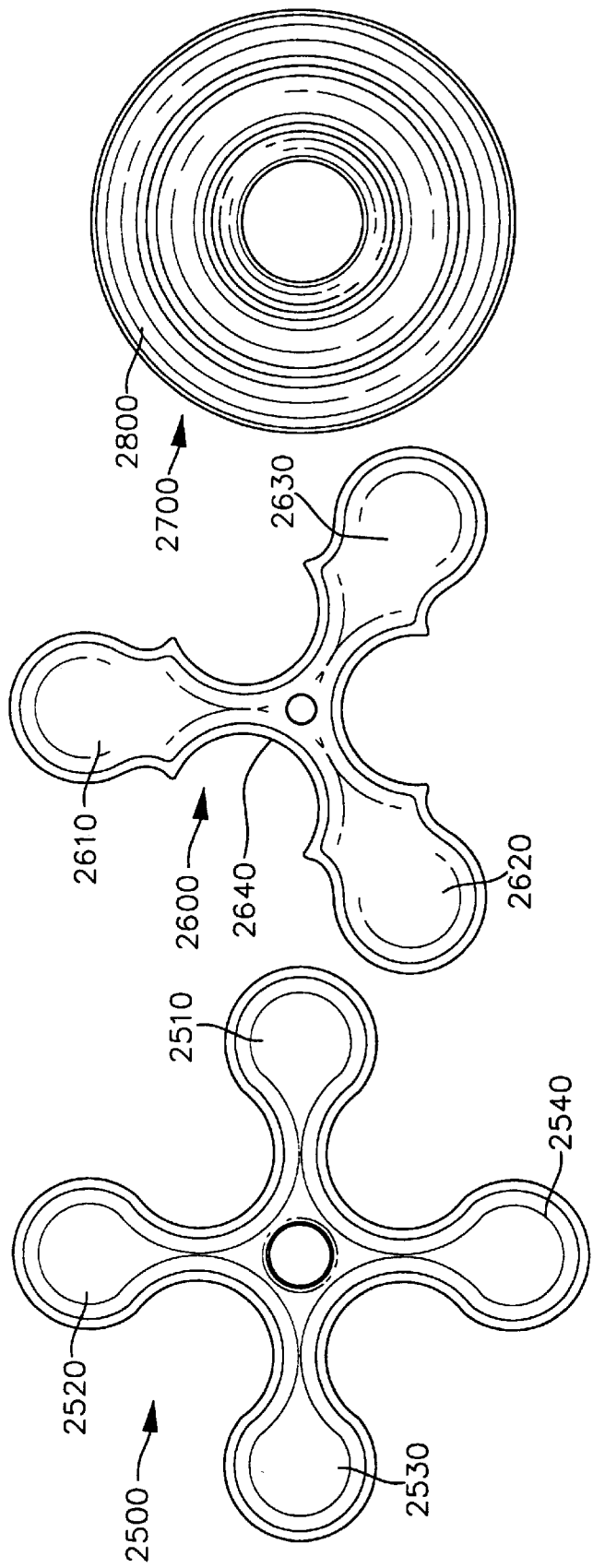

CONSTRUCTION SYSTEM

RELATED APPLICATION

Priority is claimed from provisional patent application Ser. No. 60/011,609 filed Dec. 11, 1995.

FIELD OF THE INVENTION

The present invention relates to construction systems, and more particularly to construction systems including individual construction elements having ball and jaw connections.

BACKGROUND OF THE INVENTION

There is a wide variety of construction systems, particularly in the area of toys which are available on the market and described in issued United States and foreign patent applications. Such construction systems commonly have elements with male interlock means and female interlock means for connecting the elements together. Although a group of such construction elements can generally be interconnected in a variety of ways, such systems generally have a number of limitations including:

(i) an interlock means of one type cannot interlock with another interlock means of the same type;

(ii) only one type of male/female interconnection is possible;

(iii) a male/female connection has only one angular orientation, or a limited range of angular orientations;

(iv) some surfaces of a construction element cannot be used in forming an interconnection;

(v) only one size scale of elements is available for interconnection;

(vi) the elements are not made from an elastomeric material and therefore are not flexible;

(vii) a reconfiguration of interconnected elements is not augmented by sound effects, such as clicking or ratcheting sounds;

(viii) the elements have no resemblances to biological forms, and are therefore unable to model biological as well as other organic and inorganic systems, structures or interactions;

(ix) if the toy includes ball-and-socket connections, the ball-and-socket connections do not lock in certain orientations;

(x) the elements do not include means for small, precise and reproducible reorientations;

(xi) a small number of elements cannot be interconnected to form a closed loop;

(xii) the elements are not formed so that interconnections can be broken using leverage; and (xiii) the elements are not formed so that interconnections can be easily made.

(xiv) if two parts are in a ball-jaw connections, the ball cannot be moved within jaw from one locking position to another merely by applying mutual force.

(xv) lack of dynamic movement which mimics ergonomic movement and platonic and archimedean geometries.

(xvi) lack of resemblance to biomechanical movement, growth and forms.

(xvii) no other lips on the perimeter of a jaw or socket to accommodate a ball and shaft, as well as to provide a basin of attraction, to permit a part to stand on end, and to provide additional surface area for a interlock means by which one type of interlock means interlocks with the means of the same type.

(xviii) no other ball-jaw connection employs both friction and "locking" mechanism simultaneously to control the positioning of interconnected elements.

(xix) the same number of parts that can create a closed system and can touch any point within an imaginary sphere.

(xx) as a system, other toys do not permit complex form and movement in a small place.

(xxi) as a system, no other toys allow for modeling of complex growth and branching.

(xxii) only two elements cannot be connected in over ten different ways.

(xxiii) do not contain unique connections that also act as transition connections to other unique connections.

(xxiv) do not have an open design system.

(xxv) do not have three parts that make a triangle.

(xxvi) do not have a triangle that is both stable, yet rotating.

Consequently a need exists for a construction system which overcomes the limitations of prior systems, is easy to assemble and is inexpensive to manufacture.

SUMMARY OF THE INVENTION

The present invention is directed to a construction system which has individual construction elements which can be connected to each other by at least a ball-to-socket joint or a socket-to-socket joint. A basic construction element has a body with a ball at one end and a socket at the other end, or balls at both ends, or sockets at both ends. Other construction elements are contemplated which can have more than or less than two connectors for a single element.

A ball from one construction element can be removably inserted into the socket of another element. The socket, which will also be referred to as a jaw, has at least two petals separated by openings on either side of the petals. The ball-to-socket joint "locks" at orientations when at least one detent in the interior of the socket protrudes into at least one of a plurality of dimples on the ball. Due to the contour of the petals of the jaw the available range of orientations in a ball-to-socket interconnection is at least $2\pi$ steradians. A regular pattern of dimples on the ball allows small well-controlled and reproducible reorientations of the connection to be made.

The elements can also interconnect in many ways, such as for example, two types of socket-to-socket connections where the longitudinal axes of interconnected elements are collinear. In a socket-to-socket connection the petals of one element connect with the petals of a second element. A third type of socket-to-socket connection allows the elements to form a chain with the longitudinal axes of the elements being parallel and coplanar and orthogonal to the direction of the chain. The elements can also be interconnected by having the socket of a first element grasp the body of a second element. With the socket-to-body connection the longitudinal axes of the two elements are orthogonal and angle between the symmetry plane of the first element and the longitudinal axis of the second element is continuously adjustable through 360°. In the socket-to-body connection a closed system can be formed by the connection of three elements. The construction set may include elements of different size scales and elements having connectors of more than one size scale.

Although the invention preferably has been designed for use as a construction set in the area of toys for children, the basic features of the invention are adaptable to a wide variety of end uses. In the area of toys, a construction set of the invention is contemplated for use in building such toys as action figures, plush toys, dolls, games and preschool applications. Also, it is contemplated that the invention can be a platform for other toys, such as action figures, plush and dolls, whereby the invention's technology is imbedded in these toys rather than used as a system to build the toys. Other uses for the invention include the manufacture of furniture and hardware. In furniture applications the construction elements could be made on a large scale of a suitable material and assembled into furniture either at a factory or by a purchaser. In addition, the invention could be used as a connector for use in ready-to-assemble furniture. The ball to socket connection could be used to make furniture that moves such as a chaise patio chair. Other contemplated uses include temporary architecture such as scaffolding and office dividers.

The systems can be used for scientific modeling, e.g., molecular engineering, ergonomical and anatonmical as well as artistic modeling including poseable figures and armatures. The system could be used with respect to displays such as in store, museum, or office displays including wall mountings and shelving. The systems could be used in creating manikins in the clothing industry. The system could also be used in outdoor playground equipment, sporting goods as well as for jewelry or other clothing accessories.

Other uses contemplated are prosthetics and robotics and computer applications. In the computer area software can be developed whereby the system could be used in computer-aided modeling. It is contemplated that the system could be used to build a model that could be connected to a computer which in turn would create a virtual 3-D version of the model. Models made from the system could be connected to a computer and then manipulated to create real time animation of the virtual version of a corresponding computer-generated form, i.e., such as in electronic puppetry. Stop-motion animation is contemplated wherein the system may be used to create armatures upon which could be placed skins, clay or other material to create characters.

It is therefore a general object of the present invention to provide a construction system with elements that provide a plurality of types of interconnections.

It is therefore another general object of the present invention to provide a construction system with elements that have interconnections that allow a wide range of orientations.

It is an object of the present invention to provide a construction system with elements with an interlock means that allows the orientation between elements to be adjusted.

It is another object of the present invention to provide a construction system with elements that allow a female/female connection.

It is another object of the present invention to provide a construction system with elements that allow a plurality of types of female/female connections.

It is another object of the present invention to provide a construction system with elements that provide a male/female connection with an angular orientation that is adjustable continuous and fluid.

It is another object of the present invention to provide a construction system with elements that provide a male/female connection where an available range of orientations is at least $2\pi$ steradians.

It is another object of the present invention to provide a construction system such that three elements can be interconnected to form a closed loop.

It is another object of the present invention to provide a construction system with elements that provide a means for connecting the female connection means of one element to the region between the male and female connection means of another element, where this connection is adjustable through a range of orientations or fixed in orientation.

It is another object of the present invention to provide a construction system with elements that can produce a change of scale.

It is another object of the present invention to provide a construction system where elements have a means for producing sounds as interconnected elements are reoriented.

Further objects and advantages of the present invention will become apparent from a consideration of the drawings and the ensuing detailed description. These various embodiments and their ramifications are addressed in greater detail in the Detailed Description.

BRIEF DESCRIPTION OF THE DRAWINGS

The accompanying drawings, which are incorporated in and form a part of the present specification, illustrate embodiments of the invention and, together with the Detailed Description, serve to explain the principles of the invention.

FIG. 1A is a side view of a ball connector illustrating a roughened surface.

FIG. 1B is a side view of a ball connector illustrating concave dimples.

FIG. 1C is a side view of a ball connector illustrating convex bumps.

FIG. 1D is a top view of a ball connector illustrating a faceted surface.

FIG. 1E is a top view of a ball connector illustrating global ribs.

FIG. 1F is a side view of a ball connector illustrating open-ended connection spheres.

FIG. 1G is a side view of a ball connector illustrating spiral-shaped detents.

FIG. 1H is a side view of a perforated ball connector.

FIG. 1I is a side view of an egg-shaped ball connector.

FIG. 1J is a side view of a notched ball connector.

FIG. 2A is a front view of a perforated petal connector.

FIG. 2B is a front view of a meshed petal connector.

FIG. 2C is a front view of an open petal connector.

FIG. 2D is a front view of a petal connector formed by a plurality of finger elements.

FIG. 4 shows a perspective view of two construction elements in a first type of socket-to-socket connection.

FIG. 5B shows a perspective view of two construction elements in a ball-to-socket connection with longitudinal axes oriented at approximately 30° from each other, and with the neck of one element abutting the basin at the front edge of the lip of the other element.

FIG. 6 shows a chain of construction elements with ball-to-socket connections.

FIG. 7 shows a perspective view of two construction elements in a socket-to-body connection.

FIG. 8 shows a perspective view of two construction elements in a second type of socket-to-socket connection.

FIG. 15A is a top view of a square plate construction element of the present invention.

FIG. 15B is a top view of a triangular plate construction element of the present invention.

FIG. 15C is a top view of a circular plate construction element of the present invention.

DETAILED DESCRIPTION

Figure 1:
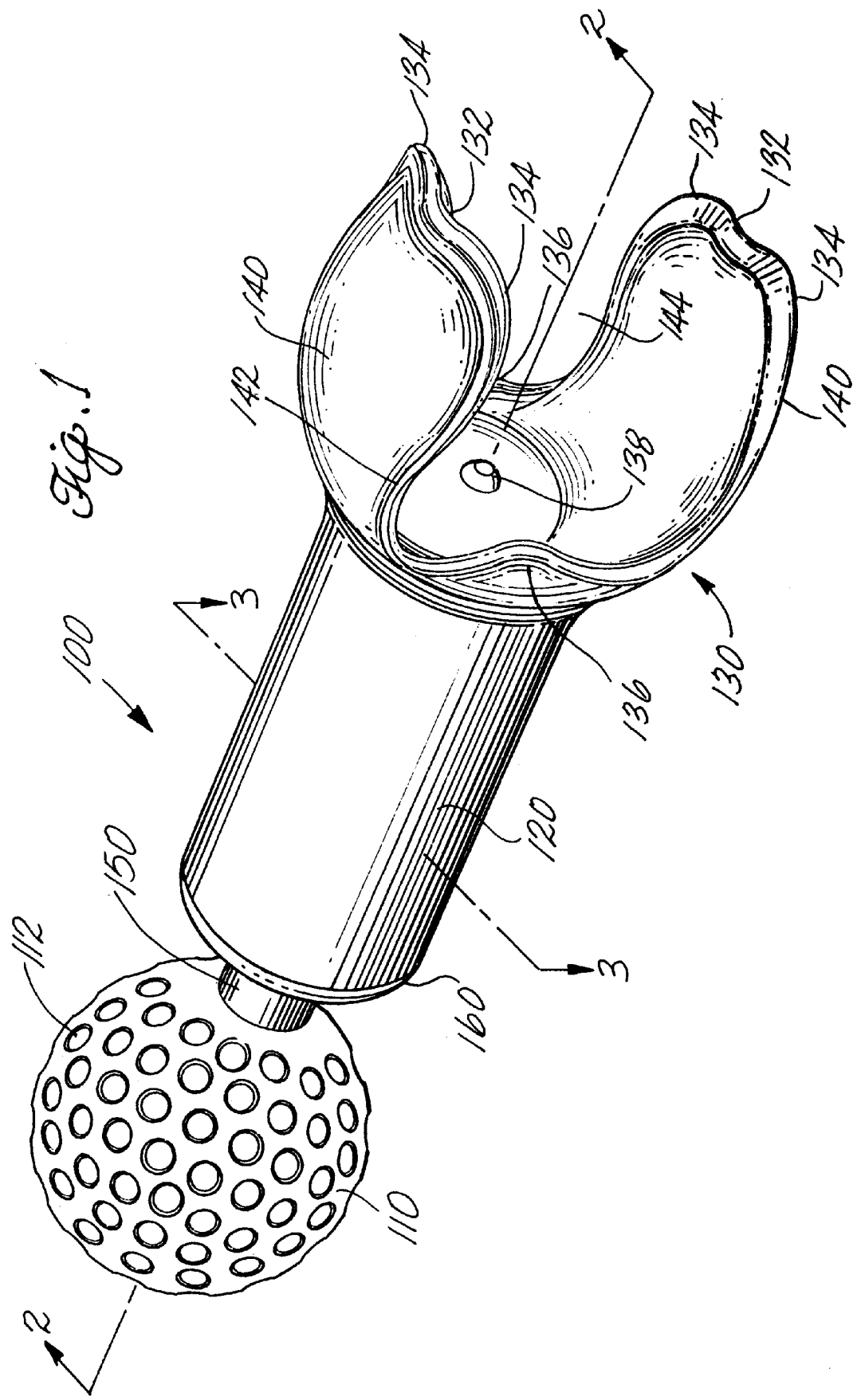
FIG. 1 shows a perspective view of the construction element of the present invention.
Figure 2:
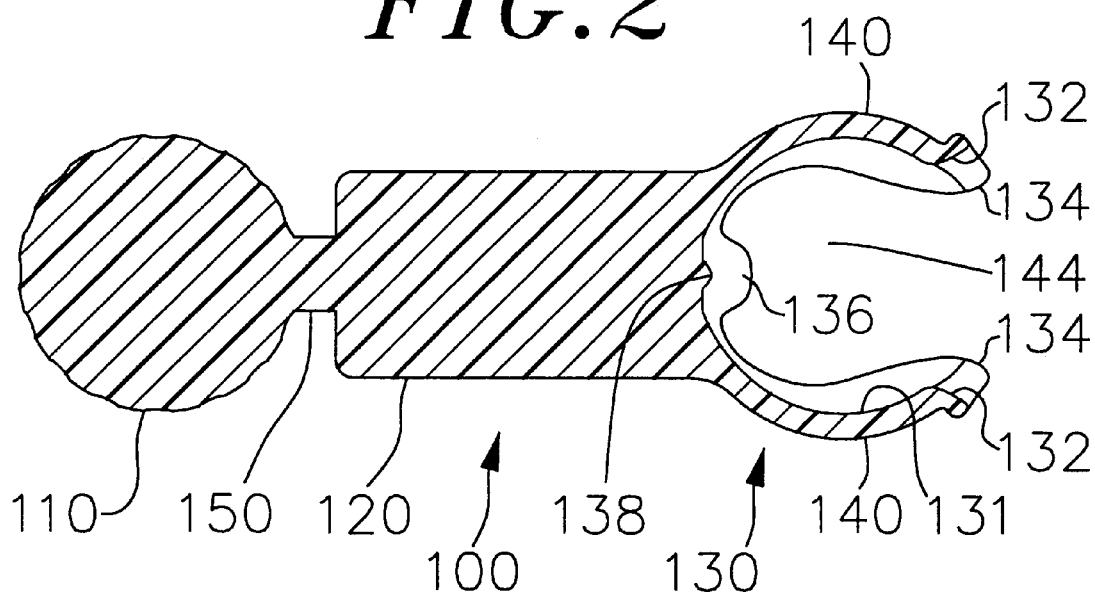
FIG. 2 shows a first cross-sectional view of the construction element of the present invention.
Figure 3:
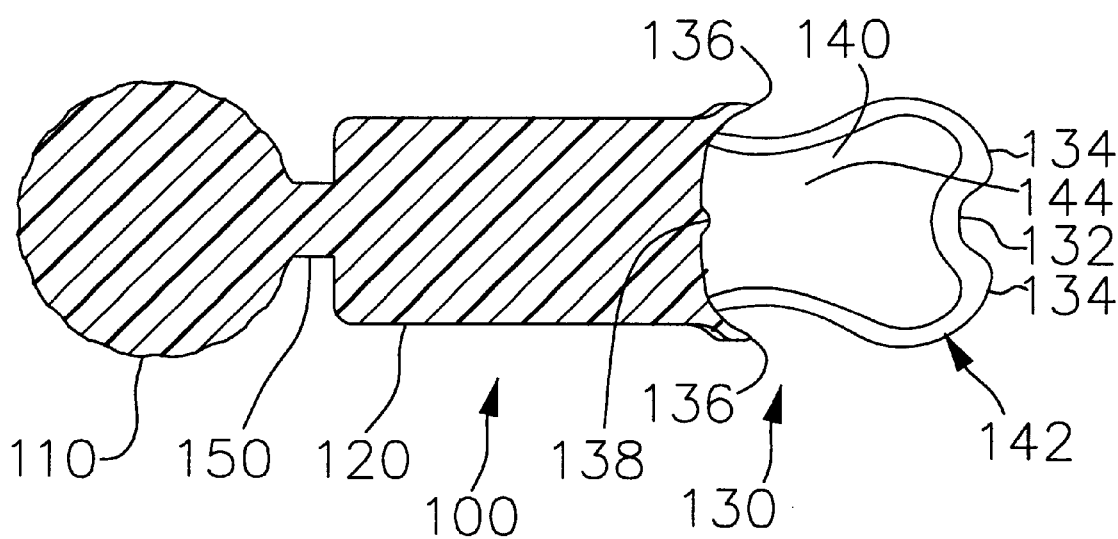
FIG. 3 shows a second cross-sectional view of the construction element of the present invention.

A basic construction element 100 according to the present invention is shown in perspective in FIG. 1, and in cross section in FIGS. 2 and 3. In the preferred embodiment the construction element 100 is made of an elastomeric compound. The construction element 100 has an elongated substantially cylindrical body section 120, with a substantially spherical ball 110 attached to the body 120 at one end via a narrow neck 150, and a socket or jaw 130 extending from the body 120 at the opposite end. Neck 150 can be circular, oval, rectangular or other shape in cross section. For example, a 0.75 inch diameter ball would include a 0.2 inch in diameter neck, a 0.548 inch in diameter body and a jaw having a 0.54 inch opening between petals of the jaw. There is a fillet at the base of the neck to add strength. The ball 110 has a plurality of small dimples 112 spaced around the surface of the ball. In the preferred embodiment, for balls 110 with a diameter of about ⅜", there are sixty two dimples 112 arranged in an isosahedral pattern (12 vertices, 20 centers, 30 midpoints) aligned on a longitudinal axis with a vertices. For balls 110 with a diameter of about ¾", there are one hundred twenty-two dimples 112 located at the centers of faces and midway along edges of a "Bucky ball" (a solid having twelve pentagonal faces, twenty hexagonal faces, and ninety edges), where the normal edges of two hexagonal faces are aligned with the longitudinal axis of the body 120.

In the Bucky ball arrangement the dimples are arranged such that 32 are located on center and 90 are on midpoint. The Bucky ball arrangement permits exceptionally accurate and broad scientific as well as mechanical modeling. The dimples have two separate diameters (larger for midpoints and smaller for centerpoints) which creates different clicking sounds, feel, and locking strength when rotated in the jaw. However, the dimples could all be the same shape, diameter and depth. It may be noted that for both of these arrangements of dimples, there are dimples along equatorial lines on the ball. Other arrangements of patterns and geometries of dimples may also be used, depending on the application. For instance, for modeling of atomic structures using the system of the present invention, the arrangement of dimples may be chosen to correspond to the orientations of electron clouds around an atomic nucleus.

By way of nonlimiting example, FIGS. 1A through 1J depict various surface arrangements of the ball 110. In FIG. 1A the outer surface 114 of ball 110 is an irregularly-shaped, roughened surface. In FIG. 1B ball 110 includes concave pie-pan shaped dimples 112 wherein the dimples have different size diameters and depths. The shallow dimples hold the ball in place while the deeper dimples allow the ball to rotate within a socket on the detent. It is also to be understood that the arrangement of the dimples can be arranged in an irregular or regular pattern around the surface of the ball. FIG. 1C illustrates ball 110 having convex bumps 113, wherein bumps 113 have uniform or varying diameters and heights. FIG. 1D illustrates ball 110 wherein the surface comprises a number of facets 115 similar to a soccer ball arrangement. It is to be understood that although facet 115 is shown as a hexagon, other geometrical shapes can form the facet. In FIG. 1E, the surface of the ball 110 is ribbed with latitudinal and longitudinal ribs 116 forming a globe-like pattern. The ribs can be formed in a sinusoidal wave pattern extending parallelly, perpendicularly or criss-crossed to form a three-dimensional gear. FIG. 1F illustrates yet another alternative arrangement wherein the surface of ball 110 includes a single open-ended sphere 117 located at the end of the ball. As shown in FIG. 1G, a spiral pattern 111 is formed around the perimeter of the ball. Similarly balls 110 can be solid or hollow. In FIG. 1H dimples 112 formed in the surface of hollow ball 110 can either form concave dimples in the surface of the ball or can pass through the wall of the ball 110 to form holes.

Other variations in the ball 110 are illustrated in FIGS. 1I and 1J. Although the preferred shape of the ball 112 is a sphere, other shapes are contemplated, such as an egg shape as illustrated in FIG. 1I. As shown in FIG. 1J ball 110 can be split or have a notch 118 so that a plate can be inserted into the opening created by the notch. A plate provides additional surfaces for additional construction elements to be connected to form various patterns. Although it is preferred that the ball 110 have a surface pattern as described, it is contemplated in a less preferred embodiment that the ball can have a smooth surface.

As also seen in FIGS. 2 and 3, the socket 130 or jaw has two opposing petals 140 with inner and outer surfaces that are substantially spherical. The inner surface 131 of the petals 140 defines the wall of a cavity 144 having a diameter approximately equal to the diameter of the ball 110. A lip 142 extending around the perimeter of the petals 140 includes a central basin 132 at the end of each petal 140, with crests 134 on each side of the basin 132 at the end of each petal 140, and bumps 136 along the lip 142 between the petals 140. The lip forms the perimeter of each petal as well as the perimeter of openings on either side of the petals. The perimeter of the opening is the reverse image of the petals. In the present specification the "outer" portion of the lip 142 will mean the portion which extends between the crests 134 of a lip 142. Similarly, in the present specification the "inner" portion of the lips 142 will mean the portion which includes the bumps 136 and extends to the crests 134. The contour of the outer portion of the lip 142 is complementary to the contour of the inner portion of the lip 142, i.e., two petals 140 of two construction elements 100 may interlock as shown in FIG. 4 (and discussed in more detail below) to form a complete sphere, much as halves of a tennis ball on opposite sides of the seam form a sphere. Therefore, the basin 132 is indented relative to the crests 134 by the same distance that the bumps 136 extend outwards. The basin 132 in the lips 142 of the socket 130 provides a passage to the interior cavity 144 of the socket 130 with a width closer to the width of the ball 110 than would be provided if the lips 142 defined a straight line connecting the crests 134 which helps limit degrees of freedom for entry of the ball.

The lip increases the surface area for a socket-to-socket connection and also can be wedged between the end of the body and the base of a ball (along the neck), i.e. a pressure fit, to provide additional strength in cantilevering parts when joined in a ball-to-socket connection. When a ball 110 is inserted into the cavity 144 via the basins 132, most of the frictional resistance is applied by the crests 134. Once the center point of the ball 110 is beyond the plane defined by the four crests 134, the ball 110 snaps into the socket 130. Similarly, when a ball 110 is withdrawn from the cavity 144 via the basins 132, most of the frictional resistance is applied by the crests 134, and once the center point of the ball 110 is beyond the plane defined by the four crests 134 the ball 110 snaps out of the socket 130. It should be noted that because the ends of the crests 134 are coplanar, the element 100 can be made to stand on the crests 134 with the longitudinal axis of the element 100 oriented vertically. It should also be noted that for the ball-and-socket connection the ball 110 is referred to elsewhere in the present specification as the male component of the connection, and the socket 130 is referred to as the female component of the connection.

The contour of the lips 142 to the inside of the crests 134, when viewed from the side as shown in the cross-sectional view of FIG. 2, approximates an arc of a circle with a diameter roughly equal to that of the body 120. This allows a socket-to-body connection as described in more detail below in association with FIG. 7.

Although the preferred petal design is that the petals have a uniform continuous surface as shown in FIGS. 1 and 2, variations in the petal design are contemplated as shown in FIGS. 2A through 2D. In FIG. 2A the petal 140 can be perforated by having a plurality of openings 141 passing through the petal. In FIG. 2B the petal 140 is meshed by having a plurality of columns 143 and rows 145 defining the petal. In FIG. 2C the petal 140 is formed by a rim 147 extending around the perimeter of the petal thus having an open center section. Petal 140 as shown in FIG. 2D is formed by a plurality of vertically oriented finger elements 149.

It is to be understood that although the preferred jaw design includes petals having a uniform surface which would cover 50% of a ball when inserted into the jaw, it is to be understood that whether the petals are continuous and uniform as depicted in FIGS. 1 and 2, or other designs which are not continuous as shown in FIGS. 2A through 2D, the jaws are considered to cover 50% of a ball inserted into the socket. In a less preferred arrangement the petals can cover less than 50% of a ball. The preferred orientation of the jaw on a construction element is that the openings on either side of a petal is perpendicular to the plane of the balls (when there is more than one ball on an element) to allow for a 90°+confirmation and to allow for a stable footing. The jaw can be turned 90°, but this is not preferred.

Figure 5A:
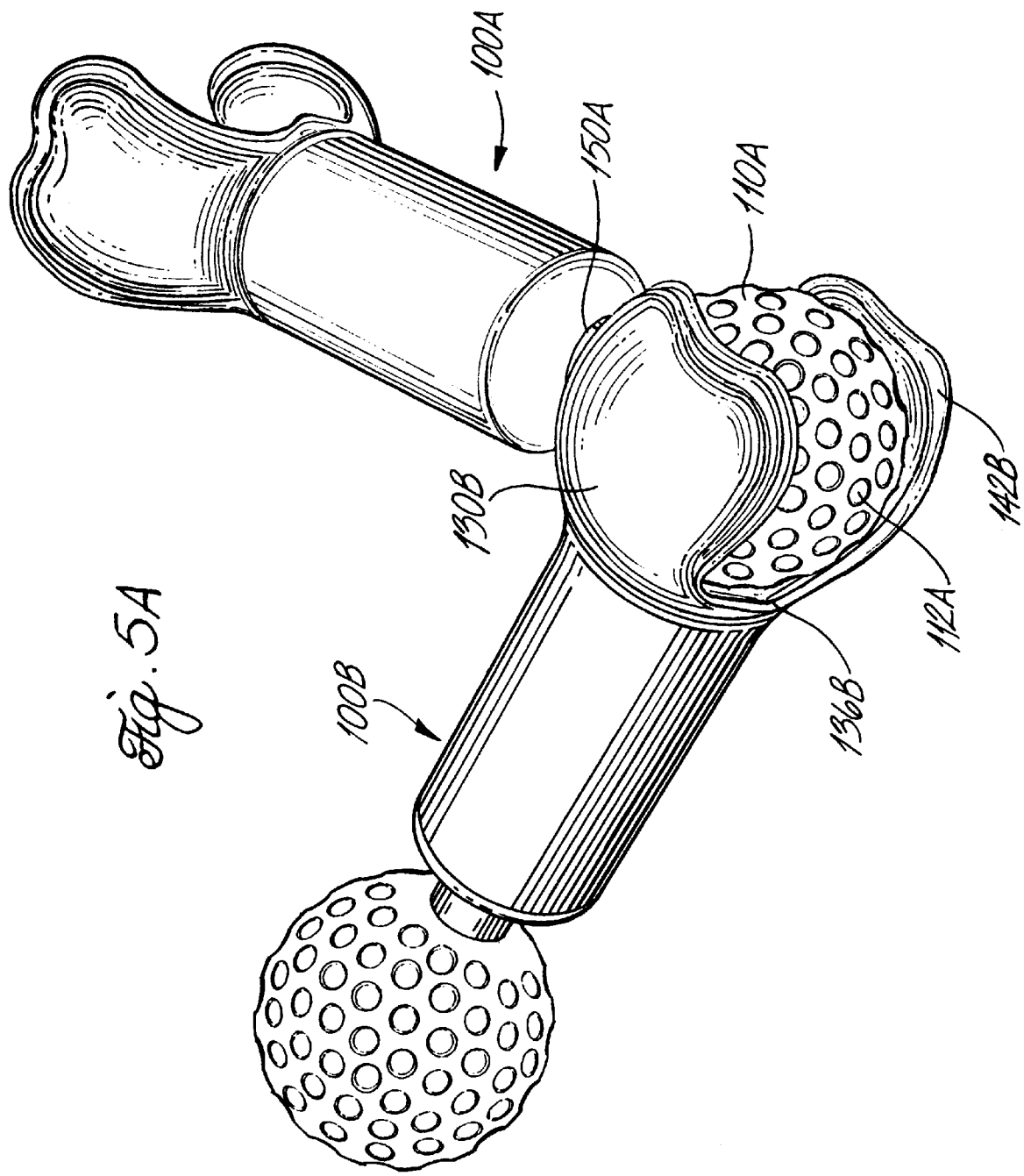
FIG. 5A shows a perspective view of two construction elements in a ball-to-socket connection with longitudinal axes oriented at approximately 120° from each other, and with the neck of one element abutting the inner portion of the lip of the other element.

Inside the socket 130 along the central longitudinal axis of the body 120 is a protruding detent 138. The detent 138 protrudes into the spherical cavity 144 of the socket 130 by approximately the same distance as the depth of the dimples 112 on the ball 110. Therefore, as shown in FIG. 5A, when the ball 110a of a first construction element 100a is inserted into the socket 130b of a second construction element 100b, and when the detent (not shown in FIG. 5A) of the second element 100b protrudes into a dimple 112a in the ball 110a of the first element 100a, the angle between the longitudinal axes of the first and second elements 100a and 100b is arrested or "locked."

Since in this embodiment there is only a single detent which is located along the longitudinal axis, the first element 100a can rotate about the longitudinal axis of the second element 100b. The geometry and construction of the ball 110a and socket 130b is such that a manually applied force can dislodge the detent of the second construction element 100b from the dimple 112a of the first construction element 100a, and rotate the longitudinal axis of the first construction element 100a relative to the longitudinal axis of the second construction element 100b. Because of the pattern of dimples 112a on the ball 110a of the first construction element 100a, the two construction elements 100a and 100b lock at angular intervals.

Although a single detent 138 is preferred, more than one detent, such as two, can be positioned within cavity 144 along the inner surface 131. If for example two detents are in any position where they are 180° apart from one another and aligned through the center of the sphere, then the ball can be locked into the same number of positions as though there was only one detent. However, where there are two detents not 180° apart, or if more than two detents, then the number of positions which the detents are able to align simultaneously is greatly reduced to twelve. Twelve is the greatest number of unique symmetrical positions when considering geometric solids as solutions.

The detent is preferably designed having a circular base with a flat top and angled sides to allow for a solid lock with the dimples in the ball. As with the dimples, the detents can be of different sizes and shapes for a different feel, sound and locking qualities. Several different size detents can exist on a single construction element to create a distinct sound and tonal variety and feel to distinguish between different detents.

Figure 3A:
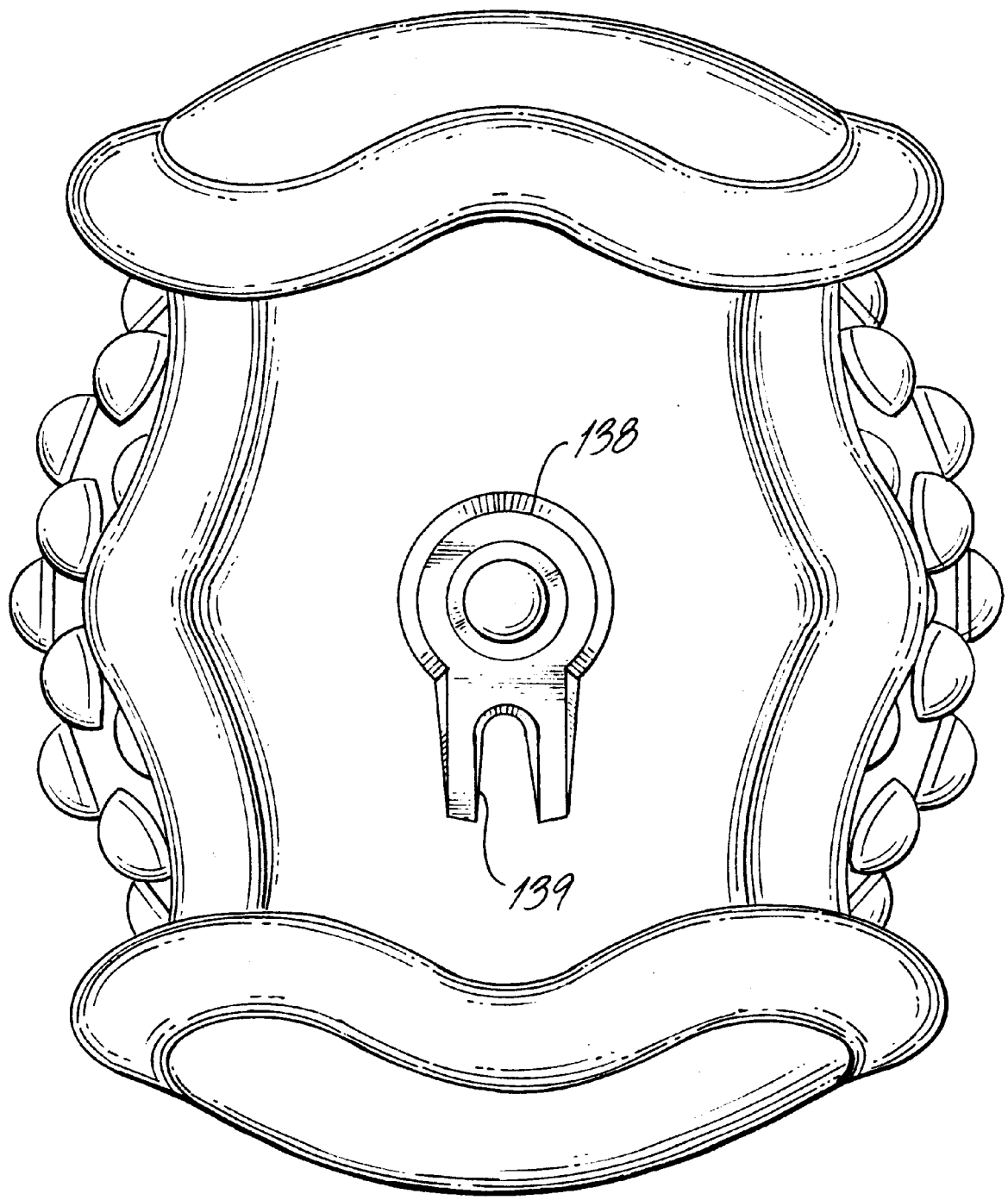
FIG. 3A is a top view of a socket illustrating a detent having a rotation limiter.

In configurations where the ball has bumps, rather than dimples, the detent 138 would be designed with a concave top as shown in FIG. 3A. In this design the detent would have a hole in the center for the bump to engage. With a single detent, a ball and socket connection axially aligned could rotate 360° around the axis of the construction elements. Detent 138 can be designed with an anti-rotation section 139 to prevent two adjoined construction elements from rotating about the axis. Section 139 includes an opening for the receipt of an adjacent bump to prevent rotation. An antirotation section could also be used for balls having dimples and would comprise a protrusion.

In FIG. 5A the longitudinal axis of the first construction element 100*a* is oriented approximately 120° from the longitudinal axis of the second construction element 100*b*, and the neck 150*a* of the first construction element 100*a* abuts a bump 136*b* in the lip 142*b* of the second construction element 100*b*. Due to the contact between the neck of the first construction element 100*a* and the bump of the second construction element 100*b*, the angle between the two elements 100*a* and 100*b* cannot be increased by rotation in the plane of the two elements 100*a* and 100*b*. However, a force applied to increase the pressure between the bump of the second construction element 100*b* and the neck of the first construction element 100*a* can be used to remove the ball 110*a* from the socket 130*b*. By dislodging the detent from a series of dimples 112*a*, the first construction element 100*a* may be rotated by approximately 240° in the plane of the two construction elements 100*a* and 100*b* from the position shown in FIG. 5A to a position where the neck of the first construction element 100*a* abuts the other bump 136*b* in the lip 142*b* of the second construction element 100*b*.

In FIG. 5B the longitudinal axis of the first construction element 100*a'* is oriented approximately 30° from the longitudinal axis of the second construction element 100*b'*, and the neck 150*a'* of the first construction element 100*a'* abuts the basin 132*b'* in the lip 142*b'* of the second construction element 100*b'*. Due to the contact between the neck 150*a'* of the first construction element 100*a'* and the basin 132*b'* of the second construction element 100*b'*, the angle between the two elements 100*a'* and 100*b'* cannot be increased by rotation in the plane of the two elements 100*a'* and 100*b'*. By dislodging the detent of the second construction element 100*b'* from a series of dimples 112*a'* in the first construction element 100*a'*, the first construction element 100*a'* may be rotated approximately 90° in the plane of the two construction elements 100*a'* and 100*b'* so that the neck 150*a'* of the first construction element 100*a'* abuts the other basin (not visible) in the lip 142*b'* of the second construction element 100*b'*.

It should be noted that the available solid angle for orientation of elements in a ball-to-socket interconnection is at least 2π steradians in the present invention, i.e., an element having a ball held in a socket can be oriented to point to approximately 50% of the surface of a sphere centered about the ball. This is superior to the solid angle made available by any socket which has a planar lip contour, since to secure a ball at least some cross sections of the socket must cover an arc greater than 180°. It may also be noted that if the arc subtended from the edge of the neck 150 to the center of the neck 150 (as seen from the center of a ball 110) is less than the arc subtended from the detent 138 to the nearest edge of the lip 142 (as seen from the center of the socket 144), then the pattern of dimples 112 on the ball 110 need not extend all the way to the neck 150.

FIG. 6 depicts of chain 300 of construction elements 310, 320, 330, 340, 350, 360 and 370 (to be referred to collectively by the reference numeral 310+), some of which have flexi-necks 328, 338, 348, 349, 358 and 368 (the geometry and function of which is discussed in detail below), connected by the type of ball-to-socket connection shown in FIGS. 5A and 5B. As shown in FIG. 6, the construction elements 310+ have body sections of varying lengths. Construction element 360 has a body 364 which is longer than the body 354 of construction element 350, which is in turn longer than the body 344 of construction element 340. Construction elements 320 and 310 have bodies 324 and 314 which are the same size as each other, but smaller than the bodies 344, 354, 364 and 374 of the construction elements 340, 350, 360 and 370 having larger diameters. Construction elements 310 and 320 have balls 312 and 322 and sockets 316 and 326 with a smaller diameter than the balls 342, 343, 352 and 362 and sockets 356, 366 and 376 of construction elements 340, 350, 360 and 370. Construction element 340 has balls 342 and 343 at both ends of the body 344. (Similarly, a construction element may have sockets at both ends of the body section, and the jaws of the sockets may be aligned, offset by 90°, or offset some intermediate angle.) Construction element 330 has a socket 336 with a cavity diameter larger than the diameter of the ball 332 of the construction element 330, and can therefore function to change the "scale" of the chain of elements 310+. The body 334 of the "scale-changing" construction element 330 has a length which is so short as to be almost nonexistent. Although only two scale sizes are depicted in FIG. 6, a construction kit may include elements with other scale sizes, and may include scale-changing elements to connect elements of adjacent or nonadjacent scale sizes.

Since the contour of the lips 142C as viewed from the side as in FIG. 7 approximates a circle with a diameter approximately equal to that of the body 120D, another possible connection between construction elements is the socket-to-body connection where the socket 130C of a first construction element 100C grasps the body 120D of a second construction element 100D. Because of the cylindrical symmetry of the body 120D of the second construction element 100D, the longitudinal axis of the body 120C of the first element 100C can be oriented at any angle relative to the plane midway between the petals 140D of the second element 100D. In addition basin 132C allows socket 130C to be connected to body 120D at an angle from the center axis of the body such that three construction elements could form a closed loop of three socket-to-body connections. In addition, an element may have a scalloped shoulder that will help hold bump 136 in place, thereby stabilizing the triangle. Alternatively, if the body 120D of the second construction element 100D has longitudinal ribs (not shown), the longitudinal axis of the body 120C of the first element 100C may lock at fixed orientations relative to the plane midway between the petals 140D of the second element 100D.

Figure 7A:
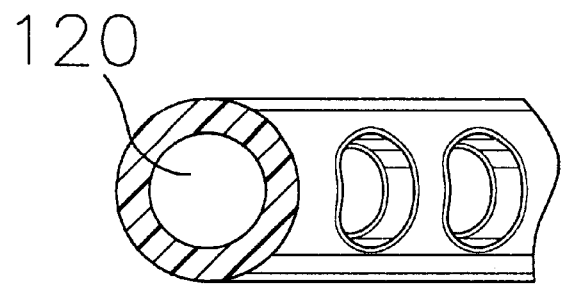
FIG. 7A is a partial schematic view of an alternative body construction.
Figure 7B:
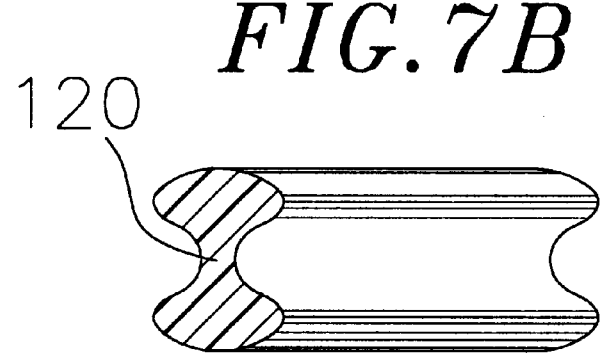
FIG. 7B is a partial schematic view of a second alternative body construction.
Figure 7C:
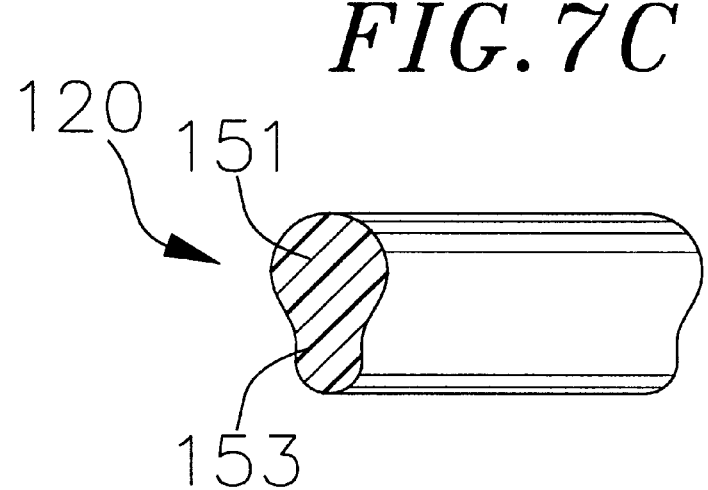
FIG. 7C is a partial schematic view of a third alternative body construction.

The preferred design for the body 120 is cylindrical as shown in FIG. 7. Other designs for the body are also contemplated as illustrated in FIGS. 7A through 7C. By way of nonlimiting example, in FIG. 7A the body 120 is perforated. In FIG. 7B the body 120 has an I-beam configuration. In FIG. 7C the body 120 comprises parallel cylinders 151 and 153 of different diameters that relate to the scales of the system so that three different scale jaws can simultaneously engage the body. Similarly the shoulder 160, see FIG. 1, of the body can have various configurations. Shoulder 160 preferably is rounded, however other designs are contemplated such as a meniscus shape 1221 shown in FIG. 13.

As mentioned above, in the socket-to-socket connection as shown in FIG. 4 the contours of the outer portions of the lips 142*e* of the petals 140*e* of a first element 100*e* are complementary to the contours of the inner portions of the lips 142*f* of a second element 100*f*, and vice versa, so that the petals 140*e* and 140*f* of two construction elements 100*e* and 100f may interlock with a distinct popping sound to form a complete sphere, much as halves of a tennis ball on opposite sides of the seam form a sphere. In this socket-to-socket connection the longitudinal axes of the bodies 120e and 120f of the elements 100e and 100f are collinear, and the planes between the petals 140e and 140f of the two elements 100e and 100f are orthogonal. No adjustment of the orientation between the elements 100e and 100f is possible. The elements 100e and 100f may be engaged and disengaged by a manually applied force.

In another type of socket-to-socket connection shown in FIG. 8 the inner edges of the lips 142g and 142h of the petals 140g and 140h of the two connecting elements 100g and 100h abut, and the outer edges of the lips 142g and 142h of the petals 140g and 140h of each element 100g and 100h grasp the bodies 120h and 120g of the opposing elements 100h and 100g. In this connection the longitudinal axes of the bodies 120g and 120h of the elements 100g and 100h are collinear, the planes between the petals 140g and 140h of the two elements 100g and 100h are orthogonal. The orientation between the elements 100g and 100h may be adjusted somewhat by pulling the elements 100g and 100h away from each other, applying a torque to one element 100g or 100h to rotate it about its longitudinal axis, or applying a force to rotate the longitudinal axis of one element 100g or 100h so it is no longer collinear with the other element 100h or 100g. The elements 100g and 100h may be engaged and disengaged by a manually applied force. Also, one can move between the FIG. 4 and FIG. 8 connection without pulling apart the elements.

Figure 9:
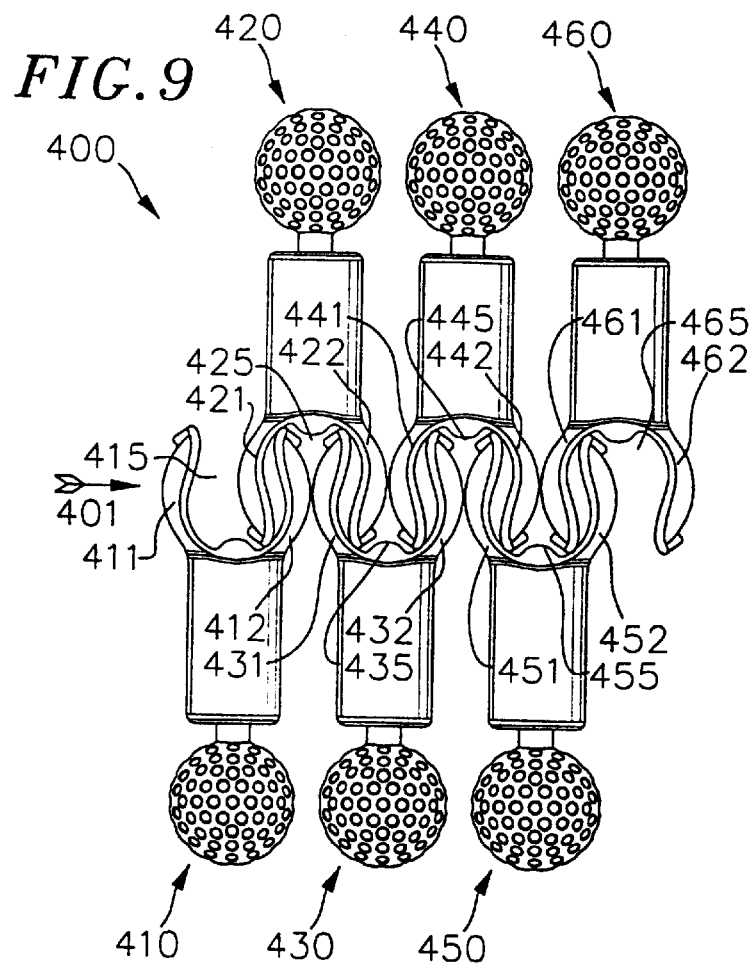
FIG. 9 shows a plan view of a chain of construction elements in a third type of socket-to-socket connection where the longitudinal axes of the elements are coplanar and transverse to the direction of the chain.

In a third type of socket-to-socket connection shown in FIG. 9 the elements 410, 420, 430, 440, 450 and 460 form a chain 400 with the longitudinal axes of the elements 410, 420, 430, 440, 450 and 460 being coplanar and orthogonal to the direction 401 of the chain 400. This type of socket-to-socket connection 400 is achieved by having a first petal of a first element and a second petal of a second element lodged between the petals of a third element. For instance, as shown in FIG. 9 the right-hand petal 412 of element 410 and the left-hand petal 431 of element 430 are lodged between the petals 421 and 422 of element 420 such that the outside surfaces of the petals 412 and 431 contact, the outer edges of the petals 412 and 431 contact the wall of the cavity 425 of element 420, and the outer edges of the petals 421 and 422 contact the walls of cavities 415 and 435 of elements 410 and 430, respectively. Similarly, the right-hand petal 422 of element 420 and the lefthand petal 441 of element 440 are lodged between the petals 431 and 432 of element 430, such that the outside surfaces of the petals 422 and 441 contact, the outer edges of the petals 422 and 441 contact the wall of cavity 435 of element 430, and the outer edges of the petals 431 and 432 contact the walls of cavities 425 and 445 of elements 420 and 440, respectively. This type of contact between petals continues for the length of the chain 400, and such a chain 400 can clearly be extended indefinitely. The geometry of the petals 411, 412, 421, 422, 431, 432, 441, 442, 451, 452, 461 and 462 (to be referred to collectively with the reference numeral 411+) is such that the crests (not labeled with reference numerals in FIG. 9) at the front edges of the petals 411+ lie inside the socket cavities 415, 425, 435, 445, 455 and 465. This chain configuration 400 permits some rotation of the elements 410, 420, 430, 440, 450 and 460 perpendicular to the plane of the elements 410, 420, 430, 440, 450 and 460, as well as some rotation in the plane of the elements 410, 420, 430, 440, 450 and 460. In an alternate embodiment of the present invention, detents at the points of contact of the outside surfaces of the petals 412 and 431, 432 and 451, 422 and 441, and 442 and 461 stabilize the chain configuration 400.

Figure 9A:
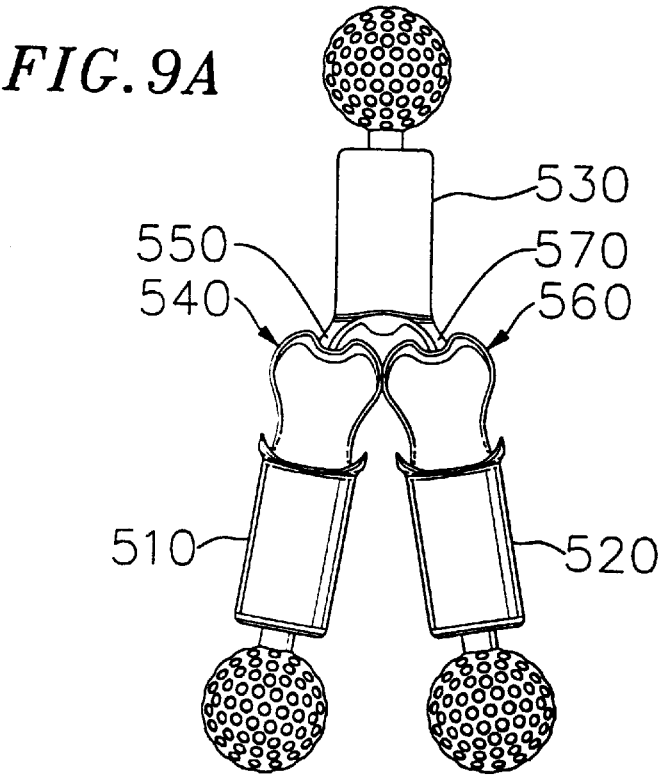
FIG. 9A shows a plan view of a pendulum socket-to-socket connection.

Yet a fourth type of socket-to-socket connection is shown in FIG. 9A. In FIG. 9A construction elements 510 and 520 are connected to construction element 530. In this configuration jaw 540 of element 510 is attached to petal 550 of element 530. Similarly jaw 560 of element 520 is connected to petal 570 of element 530. In this configuration petal 550 is in between the petals of jaw 540 and petal 570 is in between the petals of jaw 560. This connection is referred to as a pendulum connection because elements 510 and 520 swing freely like a pendulum about petals 550 and 570.

Figure 10:
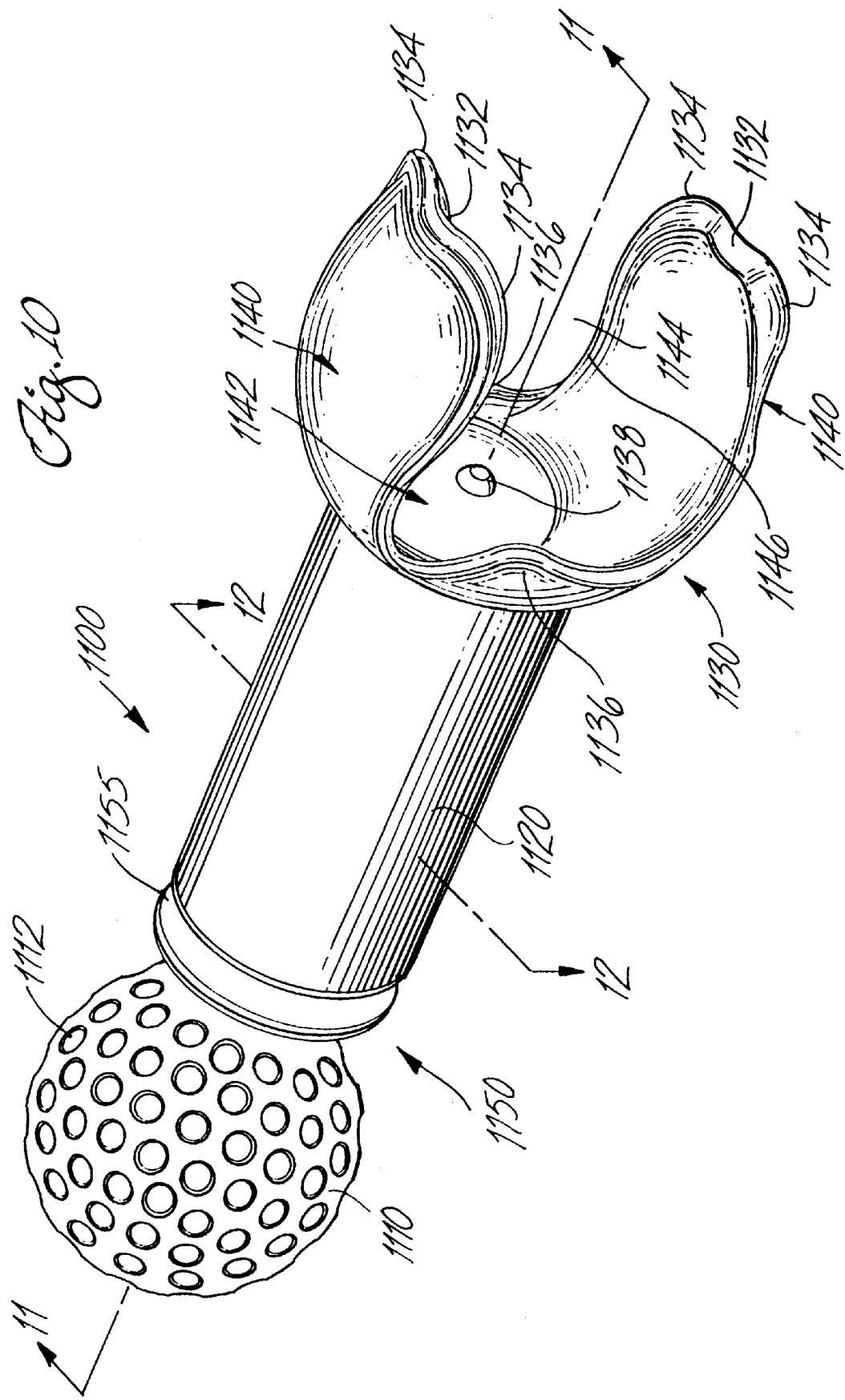
FIG. 10 shows a perspective view of an alternate embodiment of the construction element of the present invention.
Figure 11:
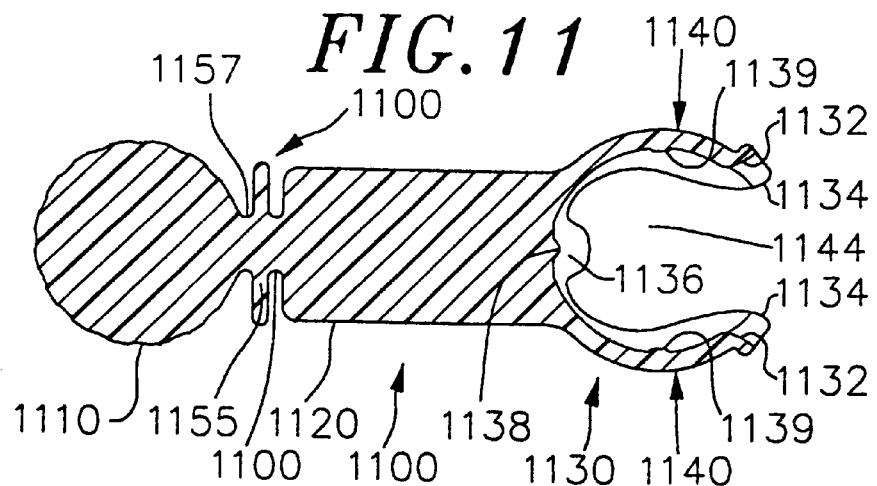
FIG. 11 shows a first cross-sectional view of the construction element of FIG. 10.
Figure 12:
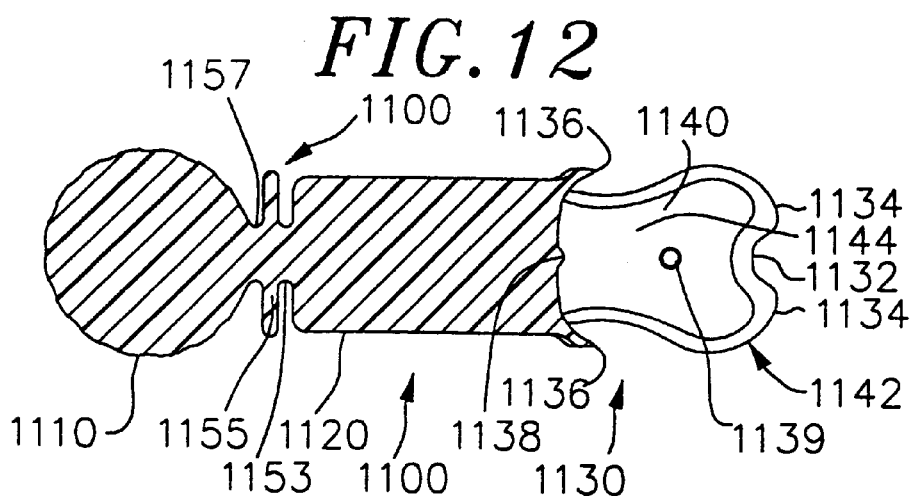
FIG. 12 shows a second cross-sectional view of the construction element of FIG. 10.

An alternate embodiment of the basic construction element 1100 of the present invention is shown in perspective in FIG. 10 and in cross-section in FIGS. 11 and 12. This construction element 1100 has the same design as the construction element 100 shown in FIGS. 1, 2 and 3, except that the construction element 1100 of FIGS. 10, 11 and 12 has a "flexi-neck" 1150 located between the ball 1110 and the body 1120, and either a single detent 1138 or two detents 1139 in the interior of the socket 1130. The flexi-neck 1150 has a central annulus 1155 which is symmetric about the longitudinal axis of the body, and is connected by narrow necks 1157 and 1153 to the ball 1110 and body 1120, respectively. The narrow necks 1157 and 1153 (or possibly the entire construction element 1100) are made of a flexible material, such as a rubber of plastic, so that if a second element of this type 1100 is connected to the first construction element 1100 by a ball-and-socket joint, the orientation of the second element is somewhat adjustable even while the detents 1138 and 1139 in the socket 1130 of the second element 1100 remains in dimples 1112 in the ball 1110 of the first construction element 1110.

Because of the design of the construction elements 100 and 1100 is the same except for the flexi-neck 1150 and the additional detents 1139, all the types of interconnections discussed above and shown in FIGS. 4–9 may also be made using the alternate preferred embodiment of the construction element 1100 of FIGS. 10–12. The contour of the neck 1157 between the annulus 1155 and the ball 1110 is such that when elements 1100 are connected by a ball-to-socket joint, the lip 1142 of a socket 1130 can be lodged between the annulus 1155 and the ball 1110 to provide additional stability to the connection.

Figure 13:
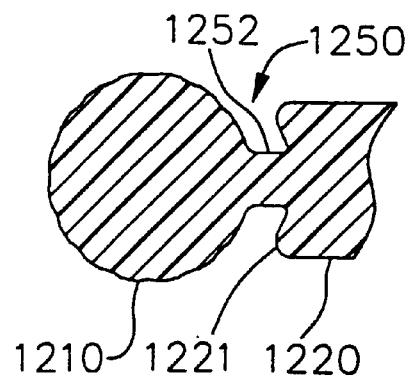
FIG. 13 shows a partial cross section of an alternate embodiment of a meniscus neck construction.

In an alternate embodiment shown in cross-section in FIG. 13, a neck 1250 extends between the meniscus shoulder 1221 of the body 1220 and ball 1210. As with the embodiment of FIGS. 10–13, when the ball 1210 of this alternate embodiment is connected to a socket 130 or 1130, the lip 142 or 1142 of the socket 130 or 1130 can be lodged into the crevice 1252 between the shoulder 1221 of the body 1220 and the ball 1210 to provide additional stability to the connection.

Figure 14:
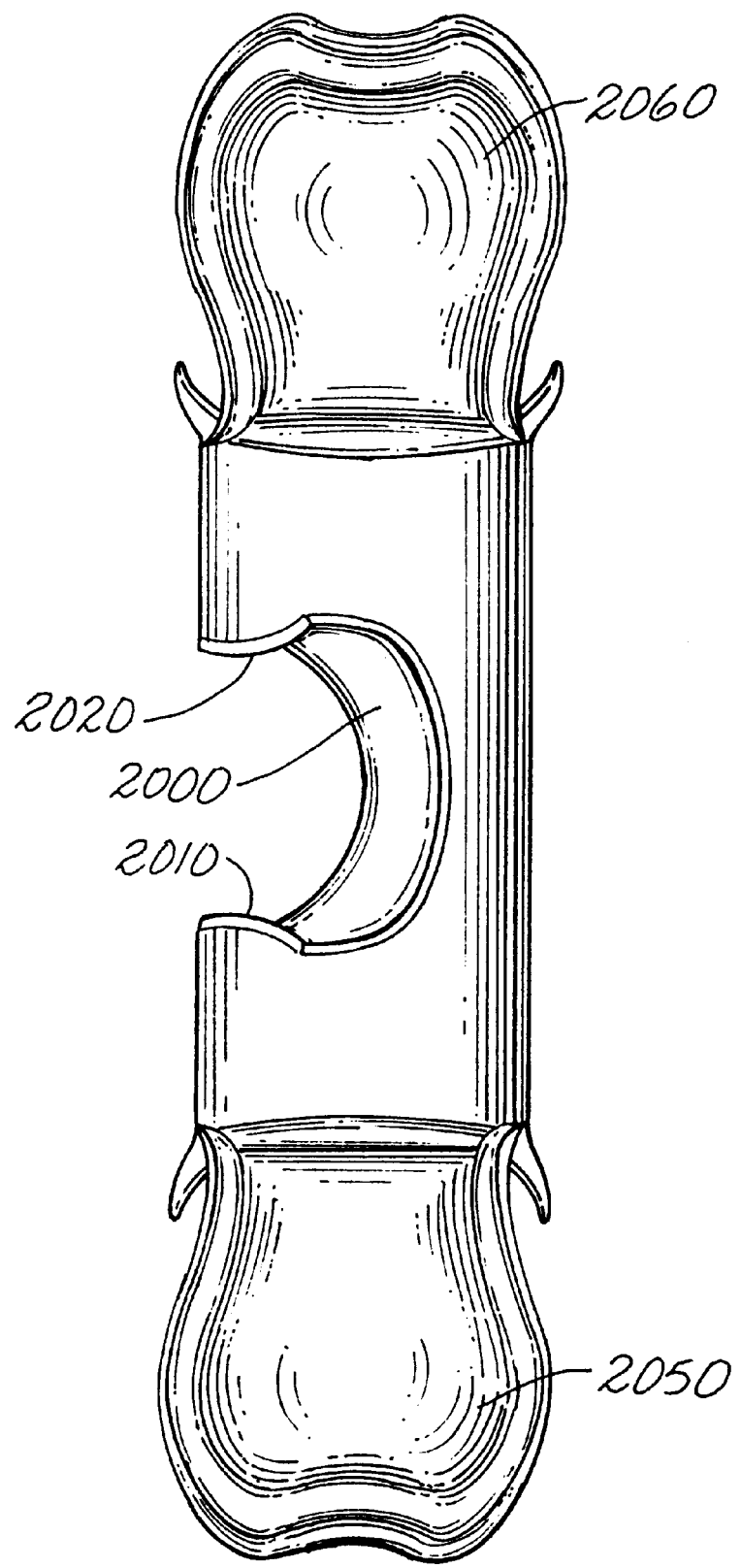
FIG. 14 is a plan view of an alternative embodiment of the present invention including a notched body.
Figure 14A:
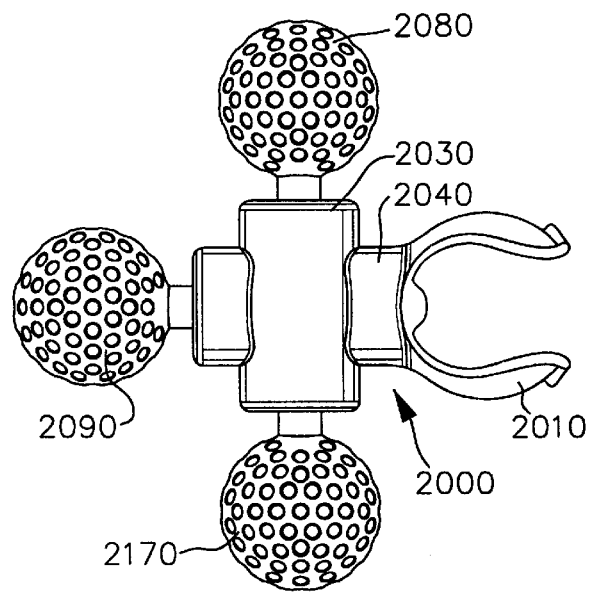
FIG. 14A is a plan view of interconnected construction elements having notched bodies.

As a part of forming a system for the construction elements, the cylindrical body can have a cavity 2000 formed along the length of the body as shown in FIGS. 14 and 14A. Cavity 2000 is a generally U-shaped housing having lips 2010 and 2020 for retaining two construction elements 2030 and 2040 as shown in FIG. 14A. Cavity 2000 can be formed in any type of construction element, such as one with two sockets 2050 and 2060 (FIG. 14), two balls 2070, 2080 or one ball 2090 and one socket 2100 as seen in FIG. 14A.

As a part of providing a complete construction kit or for modeling purposes, other system components are contemplated by the present invention as shown in FIGS. 15A through 15C. In FIG. 15A a square element 2500 is illustrated having balls 2510, 2520, 2530 and 2540 positioned on each corner of the square. A semicircular rim 2550 is positioned between each adjacent pair of balls to further provide a connection for a jaw of another construction element (not shown). FIG. 15B illustrates a triangular element 2600 having balls 2610, 2620 and 2630 positioned on each corner of the triangular element. Similarly, a semicircular rim portion 2640 is positioned between each adjacent pair of balls to provide an additional connection location for the socket of an additional construction element (not shown). The triangular element 2600 and the square element 2500 can be designed such that a ball from another construction element can be connected between the balls on the corners of elements 2500 and 2600. FIG. 15C shows a circular construction element 2700 having a circular rim 2800 positioned around the perimeter of the circular element providing a continuous connection location for a socket of additional construction elements (not shown). Other shapes are contemplated besides squares, triangles and circles. The plates as shown in FIGS. 15A through 15C can alternatively have notches on the side that would permit balls to be inserted, as well as having a hole in the center for the insertion of a ball.

Figures 16A, 16B, 16C:
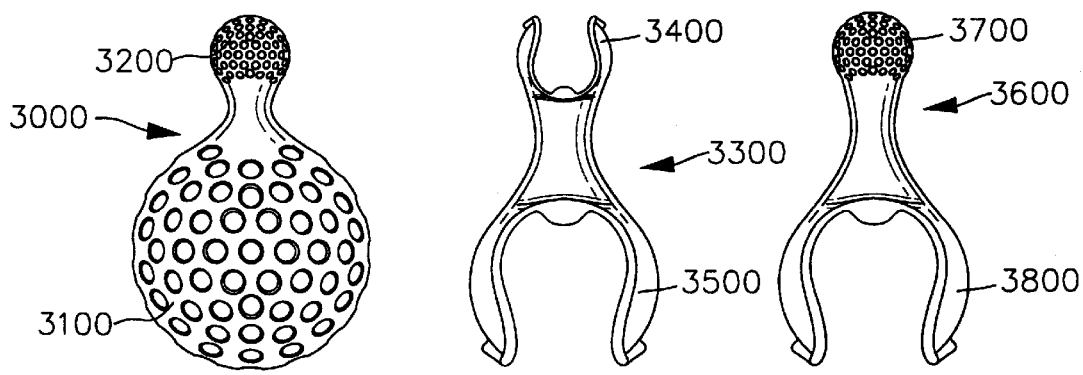
FIG. 16A is a plan view of a scaling element of the present invention.
FIG. 16B is a plan view of an alternative scaling element.
FIG. 16C is a plan view of a second alternative scaling element.

In addition the system can be scaled with a reducer element as shown in FIGS. 16A through 16C. FIG. 16A depicts reducer element 3000 having balls 3100 and 3200 of different scales. FIG. 16C illustrates reducer element 3300 having sockets 3400 and 3500 of different scales and FIG. 16C illustrates reducer element 3600 having ball 3700 and socket 3800 of different scales. The preferred scaling ratio is the Fibonacci progression (golden mean=1.618×) with three scales preferred. If the Fibonacci progression is based on volume of a ball, the growth is $x^3$, but if based on element length, the growth is $x.^2$ There can be a number of scales and the ratio between the scales could be random, Cartesian, root mean squared or harmonic for different modeling purposes.

Construction elements exist in polar coordinates that indicate integer or lesser changes in growth of the system and 3-dimensional space. These polar relationships are realized when the parts are in motion. Consequently, three equal length parts when attached in a line (ball and socket connection) can be moved such that the center of the ball at the end of the three connected parts can touch any point within an imaginary sphere which radius is equal to the distance between the center of the ball and the center of the socket (the center of the socket is determined by the center of an imaginary ball placed in the socket). Also, branching parts (parts with at least three balls, jaws or any combination thereof) have a central radially symmetrical point/locus which places all balls on an orbital originating from a point of origin. Within a particular scale, the parts are designed so that they lay out on a Cartesian grid (1, 2, 3, 4 . . . ). For example, the parts with one ball and one socket can be different lengths, but those lengths are based on simple Cartesian ratio. This permits building man-made structures such as a cube or a house, as well as other organic structures. Other embodiments of the system could lay out the parts on different grids like harmonic, root mean squared and Fibonacci series.

The construction elements preferably are manufactured with two hollow halves sonic-welded together. Hollow elements permit the insertion of liquids, lights, sound chips, etc., within individual construction elements. All the construction elements can be made of several parts assembled together, they can be manufactured as a single part through in-mold assembly. In-mold assembly allows for multiple colors and multiple materials per part. It also allows for moving parts such as a spinning ball or telescoping bodies.

Although the construction elements of the present invention have been preferably depicted as having cylindrical bodies, the bodies of the elements can also be shaped or decorated to resemble plants, animals, man-made objects or the like or be made of almost any material like rubber, metal, foam or plush. Alternatively, the bodies may have the shapes of bones, branches, bamboo sections, bricks, the electron clouds of atomic bonds, etc. This exemplifies the open design of the system that permits almost any material or design to take the place of the cylindrical body, which among other things, permits the system to be used as a platform toy to integrate licensed properties and to be marketed as toys other than a building toy. The construction elements of the present invention can be used for architectural or engineering purposes, or to construct temporary, semi-permanent or permanent structures. In addition, the socket section may be decorated to resemble the head of an animal, e.g., by having a pair of eyes painted on or molded into one side of the jaw; or the ball could be replaced with a head or other object.

Although the above description contains many specificities, these should not be construed as limiting the scope of the invention, but as merely providing illustrations of some of the preferred embodiments of this invention. Many variations are possible and are to be considered within the scope of the present invention. For instance: the body of the construction elements need not be elongated or cylindrical; the balls need not have dimples and/or the socket need not have a detent, so that the relation of two elements interconnected by a ball-to-socket connection is continuously adjustable; a socket may only have two detents, for instance with one detent located on each petal; a socket may have more than three detents; the dimples on a ball need not be arranged as specified above; the dimples may be very closely spaced so that small, well-controlled reorientations of a ball-to-socket connection can be made; a socket may have a spring-loaded pin to lock the orientation of a ball; a cotter pin may be used to lock a ball in place in a socket; means may be provided to apply inwards force to the petals of a socket to fix the orientation of a ball within the socket; for elements interconnected by any of the above-described socket-to-socket connections, the relation between elements may be adjustable; the body of an element may have longitudinal ridges so that when another element is connected to it by a socket-to-body connection, the orientation of the other element may lock at a plurality of discrete angles; the body of a first element may have longitudinal ridges and may be free to rotate relative to the ball and socket, so that when one or more additional elements is connected to the first element by socket-to-body connections, the orientation of the additional elements lock at a plurality of discrete angles relative to each other, and the additional elements may be rotated about the axis of symmetry of the body of the first element; the body of an element may have a transverse ridge at each end so that when another element is connected to it by a socket-to-body connection, the other element cannot slide off the ends of the body; the neck connecting the ball to the body may have an elliptical or other cross-section rather than a circular cross section, and the major axis of the ellipse may have a length equal to the distance between basins on opposing petals of a socket so that the neck can be lodged between the jaws; the neck between the ball and the body of an element may have other cross-sectional shapes, such as square, triangular, rectangular, star-shaped, or asterisk-shaped; the construction set need not include elements of more than one size scale and need not include elements having connectors of more than one size scale; construction elements may have through-bores to lower the weight of the elements and/or provide receptacles for elements of a smaller scale; elements may have a longitudinal bore so that a chain of elements connected end-to-end can provide a conduit for fluids, powders, wires, marbles, etc.; elements may be constructed of metal for use as a truss or the like; elements may be fabricated from a non-flexible material such as metal, and may be divided in half along a plane passing through the central longitudinal axis and located midway between the jaws, so that when a metal ball is placed between the jaws of an element, and the two halves of the element are secured together, the ball cannot be removed; a clicking sound may be produced when a ball is reoriented in a socket; elements may be adapted to function as a whistle, wind instrument, keyboard instrument, and/or percussion instrument; the set of construction elements may be adapted for use as an animation object or an animation skeleton; the elements may include an additional system of connectors, such as magnetic connectors; the set of construction elements may include wings, wheels and axles; large construction elements can be blow molded to keep the weights of the elements within reasonable bounds; the balls may be faceted instead of dimpled ball, body and jaw can be made separately and then assembled and reassembled based on consumer's needs; etc.

Many other variations are also to be considered within the scope of the present invention. Thus the scope of the invention should be determined not by the examples given herein, but rather by the appended claims and their equivalents.

What is claimed is:

1. A construction system comprising:
   a first construction element having a first attachment means and a second attachment means; and
   a second construction element having a first attachment means and a second attachment means; wherein
   at least one of the first attachment means or the second attachment means of the first and second construction elements comprises a rigid, deflectable socket having at least two spaced apart petals, each of said petals having a lip portion along a perimeter of the petals such that a spheroid is formed when the lip portion of the sockets are firmly engaged coextensively, one socket with another.

2. The construction system of claim 1 wherein the other of the first or second attachment means is a second socket having at least two spaced apart petals configured to form a spheroid when the petals of the sockets are connected.

3. The construction system of claim 1 wherein the other of the first or second attachment means is a ball sized to fit within the socket.

4. The construction system of claim 3 wherein the first and second construction elements include a body portion positioned between the first and second attachment means.

5. The construction system of claim 4 wherein the construction elements further include a neck portion positioned between the body portion and the ball.

6. The construction system of claim 3 wherein the construction elements further include means for locking a position of the ball within the socket.

7. The construction system of claim 6 wherein the locking means comprises at least one detent in the socket which engages at least one dimple in a surface of the ball.

8. The construction system of claim 7 wherein there are a plurality of dimples arranged in a Bucky Ball pattern.

9. The construction system of claim 3 further including a third construction element having first attachment means and second attachment means wherein the first, second and third construction elements can be interconnected such that the third construction element can be articulated to any location within the volume of a sphere.

10. The construction system of claim 3 wherein the socket is configured to provide at least $2\pi$ steradians of movement for a ball and socket connection between the first and second construction elements.

11. The construction system of claim 3 further including a third construction element having a first attachment means and a second attachment means wherein the first construction element and the second construction and the third construction element can be interconnected to form a closed loop.

12. The construction system of claim 2 wherein said sockets are configured to form a connection with said body portion.

13. A construction system comprising:
    a first construction element having a body portion and at least one socket connector positioned on the body portion;
    a second construction element having a body portion and at least one ball connector extending from said body portion by a smaller dimensioned portion;
    said socket having at least two spaced apart resilient petals for receiving the ball and configured to provide at least $2\pi$ steradians range of movement of the second construction element with respect to the first construction element; and
    at least one integral detent positioned within the socket, and engagement means on the ball for receipt of the detent to resiliently engage a position of the ball within the socket.

14. The construction system of claim 13 wherein the petals have lips around a perimeter of the petals which are engageable with a neck positioned on the second construction element between the body portion and the ball connector.

15. The construction system of claim 13 wherein the engagement means comprises at least one dimple in a surface of the ball.

16. The construction system of claim 13 wherein the engagement means comprises at least one protrusion from the surface of the ball, the detent having means for receiving the protrusion.

17. The construction system of claim 16 wherein there are a plurality of protrusions on the surface of the ball and the detent includes means for limiting rotation of the ball within the socket.

18. The construction system of claim 13 wherein said second construction element further includes a socket connector having two spaced apart petals configured to form a spheroid when the petals of the first and second construction elements are interconnected.

19. The construction system of claim 13 further including a third construction element having a first attachment means and a second attachment means wherein the first construction element and the second construction and the third construction element can be interconnected to form a closed loop.

20. The construction system of claim 13 further including a third construction element having first attachment means and a second attachment means wherein the first, second and third construction elements can be interconnected such that the third construction element can be articulated to any location within the volume of a sphere.

21. A connection comprising:

a rigid deflectable first jaw covering 2π steradians of a sphere, said first jaw having at least two petals each having an outer perimeter; and a rigid deflectable second jaw, covering 2π steradians of a sphere, said second jaw having at least two petals each having an outer perimeter; wherein the outer perimeter of the petals of the first jaw engage with the outer perimeter of the petals of the second jaw to rigidly connect the jaws together.

22. A construction system comprising:

a plurality of construction elements including first and second construction elements, each construction element having a body portion and a coupling portion extending therefrom configured to interconnect with another construction element within the system;

wherein the coupling portion of the first construction element includes a generally ball shaped structure which has an array of surface features defined thereon, and the coupling portion of the second construction element includes a generally socket shaped structure configured to receive the ball shaped structure, said socket shaped structure having at least two spaced apart flexible petals and at least one detent to engage said surface features of the ball shaped structure to permit relative rotation of the ball shaped structure in the socket shaped structure along the axis defined by the detent or detents and the ball center when the ball shaped structure is received in the socket shaped structure.

23. A construction system comprising:

a plurality of construction elements each having a body portion and first and second coupling portions configured to interconnect with another construction element within the system;

wherein the first coupling portion of each construction element include a generally ball shaped structure which has a predefined array of surface features, and the second coupling portion of each second construction element include a generally socket shaped structure configured to receive said ball shaped structure of the first coupling portion, said socket shaped structure having at least two spaced apart flexible petals and at least one integral detent for releasably interlocking the second coupling portion of one construction element with said surface features of the ball shaped structure of another construction element when the ball shaped structure is received in the socket shaped structure, thereby to resist a change in orientation of the ball shaped structure in the socket shaped structure yet permits relative rotation of the ball shaped structure in the socket shaped structure along the axis defined by the detent or detents and an engaged ball shaped structure center.

24. A construction system as claim 22 above wherein the detent of the socket shaped structure and the surface features of the ball shaped structure are configured to mate in a snap fit manner as the ball shaped structure is rotated in the socket shaped structure, thereby releasably interlocking the first and second coupling portions of two construction elements.

25. A construction system as claim 23 above wherein the detent of the socket shaped structure and the surface features of the ball shaped structure are configured to mate in a snap fit manner as the ball shaped structure is rotated in the socket shaped structure, thereby releasably interlocking the first and second coupling portions of two construction elements.

26. A construction system as claim 25 above wherein the surface features of the ball shaped structure are configured to define interlocking locations for mating with the detent such that the ball shaped structure may be rotatably indexed from one interlocking location to another by application of an external force.

27. A construction system as claim 26 wherein the detent and the surface features are configured to be unitary to the socket shaped and ball shaped structures, respectively, with no moving parts.

\* \* \* \* \*